US009497375B2

(12) United States Patent
Nakagawa et al.

(10) Patent No.: US 9,497,375 B2
(45) Date of Patent: Nov. 15, 2016

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventors: Kazuo Nakagawa, Yokohama (JP); Hiroshi Yashima, Kawasaki (JP); Katsutoshi Horima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/535,725

(22) Filed: Nov. 7, 2014

(65) Prior Publication Data

US 2015/0130987 A1    May 14, 2015

(30) Foreign Application Priority Data

Nov. 13, 2013  (JP) ................. 2013-235386

(51) Int. Cl.
*H04N 5/232*    (2006.01)
*G03B 13/36*    (2006.01)

(52) U.S. Cl.
CPC .......... *H04N 5/23212* (2013.01); *G03B 13/36* (2013.01); *H04N 5/23209* (2013.01); *H04N 5/23293* (2013.01)

(58) Field of Classification Search
USPC ....................................................... 348/349
See application file for complete search history.

(56) References Cited

U.S. PATENT DOCUMENTS

2007/0122137 A1* 5/2007 Ohnishi ................. G03B 13/34
                                                        396/123
2010/0321516 A1* 12/2010 Kashiwagi ......... H04N 5/23241
                                                       348/222.1

FOREIGN PATENT DOCUMENTS

| JP | 2003-295047 A | 10/2003 |
| JP | 2007-041095 A | 2/2007 |
| JP | 2009-244429 A | 10/2009 |
| JP | 2010-117680 A | 5/2010 |

* cited by examiner

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

An image capturing apparatus comprises an imaging unit, a sensor unit, a first focus detection unit configured to detect a first in-focus position based on a pair of image signals, a second focus detection unit configured to detect a second in-focus position based on a signal output from the imaging unit, a control unit configured to control a position of the focus lens and control display indicating the focus detection areas, and a correction unit configured to acquire a correction amount for correcting the first in-focus position, wherein the correction unit determines a first focus detection area from which the correction amount is to be acquired while the focus lens is moved to the second in-focus position, and wherein the control unit controls the first focus detection area to be identifiable.

24 Claims, 19 Drawing Sheets

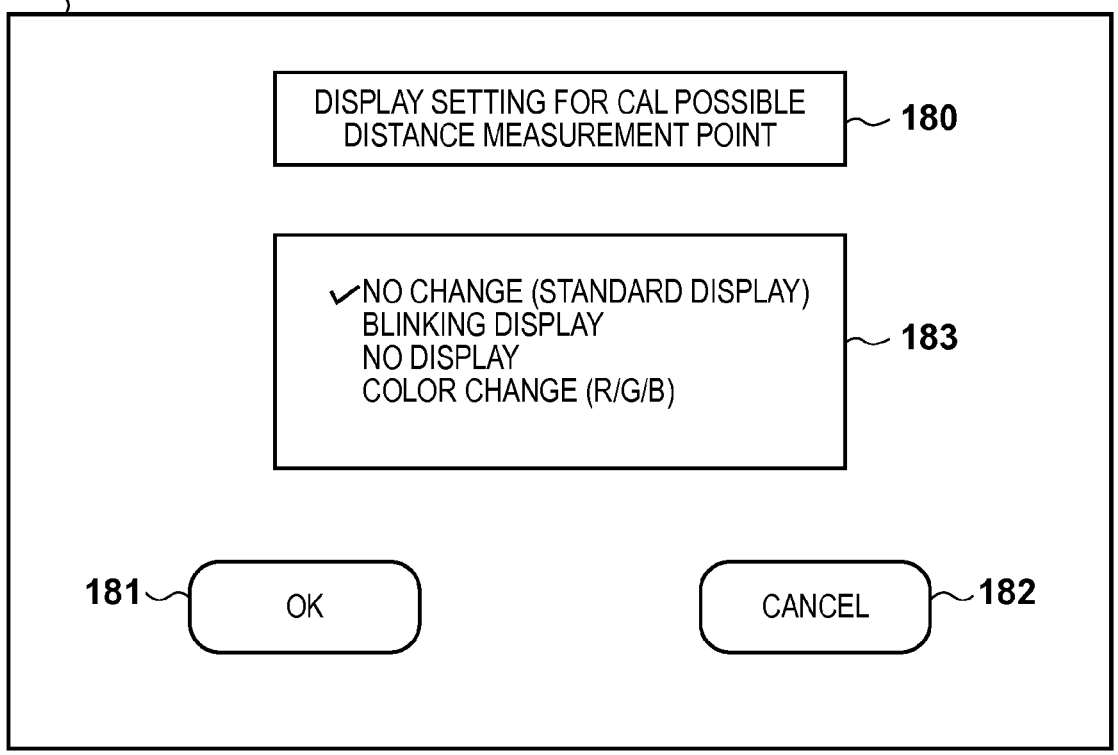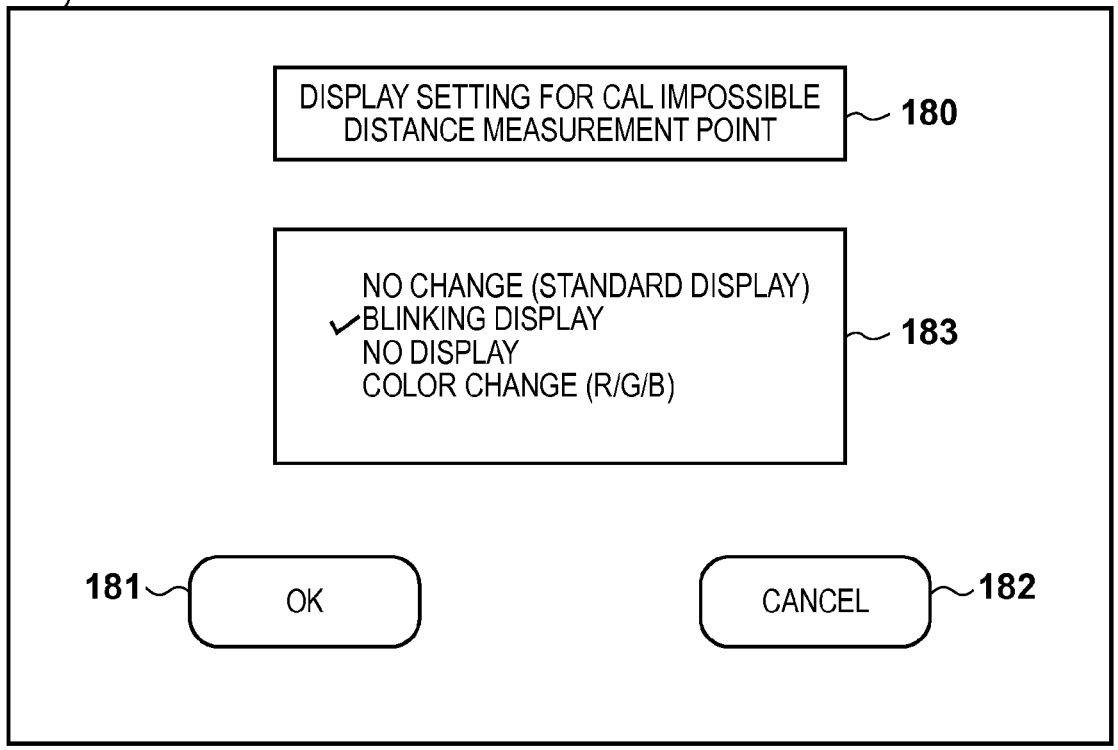

IMAGE CAPTURING APPARATUS, METHOD OF CONTROLLING THE SAME, AND STORAGE MEDIUM

BACKGROUND OF THE INVENTION

Field of the Invention

The present invention relates to a technique of correcting the in-focus position obtained by a phase difference detection method based on the in-focus position detected by a contrast detection method.

Description of the Related Art

Conventionally, there is known a technique of performing focus detection by the phase difference detection method of detecting the focus state (defocus amount) of an imaging optical system from the phase difference between a pair of images formed by light passing through the imaging optical system in an interchangeable lens in a lens-interchangeable image capturing apparatus such as a single-lens reflex camera. Such a phase difference detection method has a problem that an in-focus position may not be accurately detected due to the influences of a light source, the color or the type of an object, or the like at the time of imaging.

In order to solve such a problem, Japanese Patent Laid-Open No. 2003-295047 discloses a camera having a focus calibration function for correcting the in-focus position obtained by the phase difference detection method based on the in-focus position detected by the contrast detection method. In the contrast detection method, a focus evaluation value indicating the contrast of an object is obtained from the video signal generated by using the image sensor of a digital camera, and the position of a focus lens where the focus evaluation value is maximized is set as an in-focus position. When detecting a position where a maximum focus evaluation value is obtained, changes in focus evaluation value are monitored while the focus lens is finely driven. The digital camera disclosed in Japanese Patent Laid-Open No. 2003-295047 corrects the in-focus position obtained by the phase difference detection method at the time of imaging by using the correction value obtained by focus calibration, and moves the focus lens to the in-focus position after the correction, thereby performing more accurate in-focus control.

In addition, according to Japanese Patent Laid-Open No. 2007-041095, the pseudo-object image generated inside a camera is displayed on an external display device, and an in-focus position is obtained with respect to the pseudo-object image by each detection method in the focus calibration mode. Disclosed is a camera which corrects the in-focus position obtained by the phase difference detection method from the detection result.

Recently, in a focus detection apparatus based on the phase difference detection method, as a focus detection area increases with respect to an imaging field angle in accordance with user's requirements, the number of detection points increase. This makes it necessary to consider a focus calibration method in accordance with a focus detection apparatus based on the phase difference detection method which is mounted in an image capturing apparatus.

However, the related art disclosed in Japanese Patent Laid-Open No. 2003-295047 described above makes no reference to focus calibration methods or display methods corresponding to different detection areas or detection point counts. In addition, the above related art only mentions that, with regard to an object used for in-focus position detection at the time of calibration, it is preferable to use, for accurate focus calibration, a dedicated chart rather than a general object.

According to the related art disclosed in Japanese Patent Laid-Open No. 2007-041095, in order to perform focus calibration, it is necessary to display a dedicated chart (pseudo-object image) on an external display device. For this reason, even if a user needs to perform focus calibration in a field, he/she cannot perform focus calibration without any external display apparatus.

SUMMARY OF THE INVENTION

The present invention has been made in consideration of the above problem, and makes it possible to perform a focus calibration of a focus detection of a phase difference method using a general object without using a dedicated chart.

According to the first aspect of the present invention, there is provided an image capturing apparatus comprising: an imaging unit configured to generate an imaging signal by photoelectrically converting an object image formed by an imaging optical system including a focus lens; a sensor unit including a plurality of pairs of sensors each of which generate a pair of image signals by photoelectrically converting an object image formed by the imaging optical system in correspondence with each of a plurality of focus detection areas; a first focus detection unit configured to detect a first in-focus position based on the pair of image signals generated by the sensor unit; a second focus detection unit configured to detect a second in-focus position based on a signal output from the imaging unit; a control unit configured to control a position of the focus lens and control display indicating the focus detection areas; and a correction unit configured to acquire a correction amount for correcting the first in-focus position at the time of imaging based on a difference between the first in-focus position and the second in-focus position in a correction mode, wherein in the correction mode, the correction unit determines a first focus detection area, among the plurality of focus detection areas, from which the correction amount is configured to be acquired while the focus lens is moved to the second in-focus position by the control unit, and wherein the control unit controls display indicating the first focus detection area determined by the correction unit to be identifiable.

According to the second aspect of the present invention, there is provided an image capturing apparatus comprising: an imaging unit configured to generate an imaging signal by photoelectrically converting an object image formed by an imaging optical system including a focus lens; a sensor unit including a plurality of pairs of sensors each of which generate a pair of image signals by photoelectrically converting an object image formed by the imaging optical system in correspondence with each of a plurality of focus detection areas; a first focus detection unit configured to detect a first in-focus position based on the pair of image signals generated by the sensor unit; a second focus detection unit configured to detect a second in-focus position based on a signal output from the imaging unit; a control unit configured to control a position of the focus lens and control display indicating the focus detection areas; and a correction unit configured to acquire a correction amount for correcting the first in-focus position at the time of imaging based on a difference between the first in-focus position and the second in-focus position in a correction mode, wherein in the correction mode, the control unit performs control to identifiably display information indicating whether the correction amount is configured to be acquired with respect to each of the plurality of focus detection areas, while the focus lens is moved to the second in-focus position, and wherein the correction unit acquires the correction amount with respect to the focus detection area displayed in a first form indicating that the correction amount is configured to be acquired, whereas the correction unit limits acquisition of the correction amount with respect to the focus detection area displayed in a second form different from the first form.

According to the third aspect of the present invention, there is provided a method of controlling an image capturing apparatus including an imaging unit configured to generate an imaging signal by photoelectrically converting an object image formed by an imaging optical system including a focus lens, and a sensor unit including a plurality of pairs of sensors each of which generate a pair of image signals by photoelectrically converting an object image formed by the imaging optical system in correspondence with each of a plurality of focus detection areas, the method comprising: a first focus detection step of detecting a first in-focus position based on the pair of image signals generated by the sensor unit; a second focus detection step of detecting a second in-focus position based on a signal output from the imaging unit; a focus control step of controlling a position of the focus lens; a display control step of controlling display indicating the focus detection areas; and a correction step of acquiring a correction amount for correcting the first in-focus position at the time of imaging based on a difference between the first in-focus position and the second in-focus position in a correction mode, wherein in the correction mode, while the focus lens is moved to the second in-focus position in the focus control step, a first focus detection area, among the plurality of focus detection areas, from which the correction amount is configured to be acquired is determined in the correction step, and wherein in the display control step, display indicating the first focus detection area determined in the correction step is controlled to be identifiable.

Further features of the present invention will become apparent from the following description of exemplary embodiments with reference to the attached drawings.

BRIEF DESCRIPTION OF THE DRAWINGS

FIG. 19 is a view showing display setting for distance measurement points where focus correction values can be acquired at the time of focus calibration in individual setting for focus calibration possibility distance measurement point identification display in the fourth embodiment;

FIG. 20 is a view showing display setting for distance measurement points where focus correction values cannot be acquired at the time of focus calibration in individual setting for focus calibration possibility distance measurement point identification display in the fourth embodiment;

DESCRIPTION OF THE EMBODIMENTS

The embodiments of the present invention will be described in detail below with reference to the accompanying drawings.

First Embodiment

Figure 1:
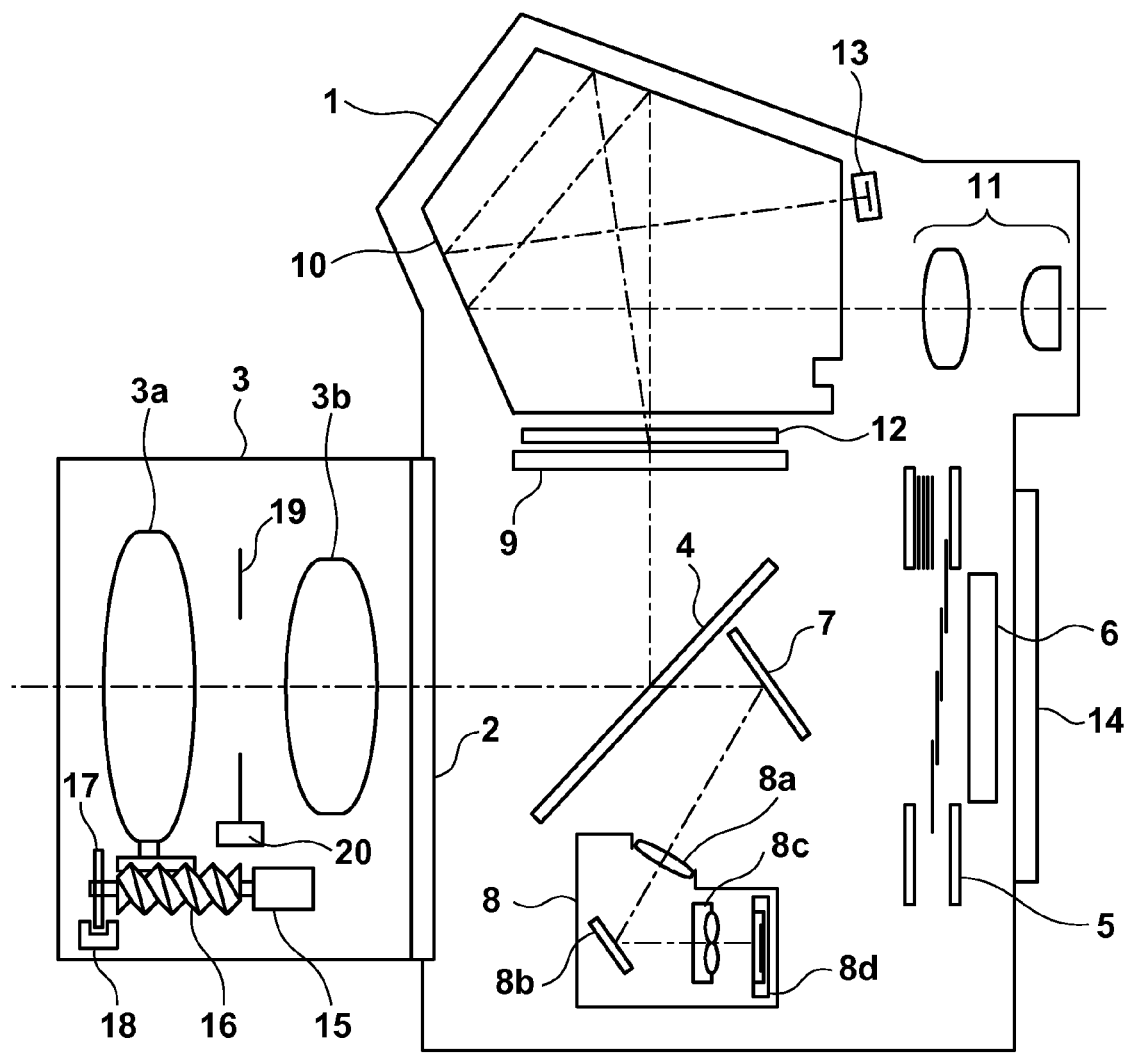
FIG. 1 is a sectional view showing the arrangement of a digital single-lens reflex camera (in a mirror-down state) according to the first embodiment of the present invention.
Figure 2:
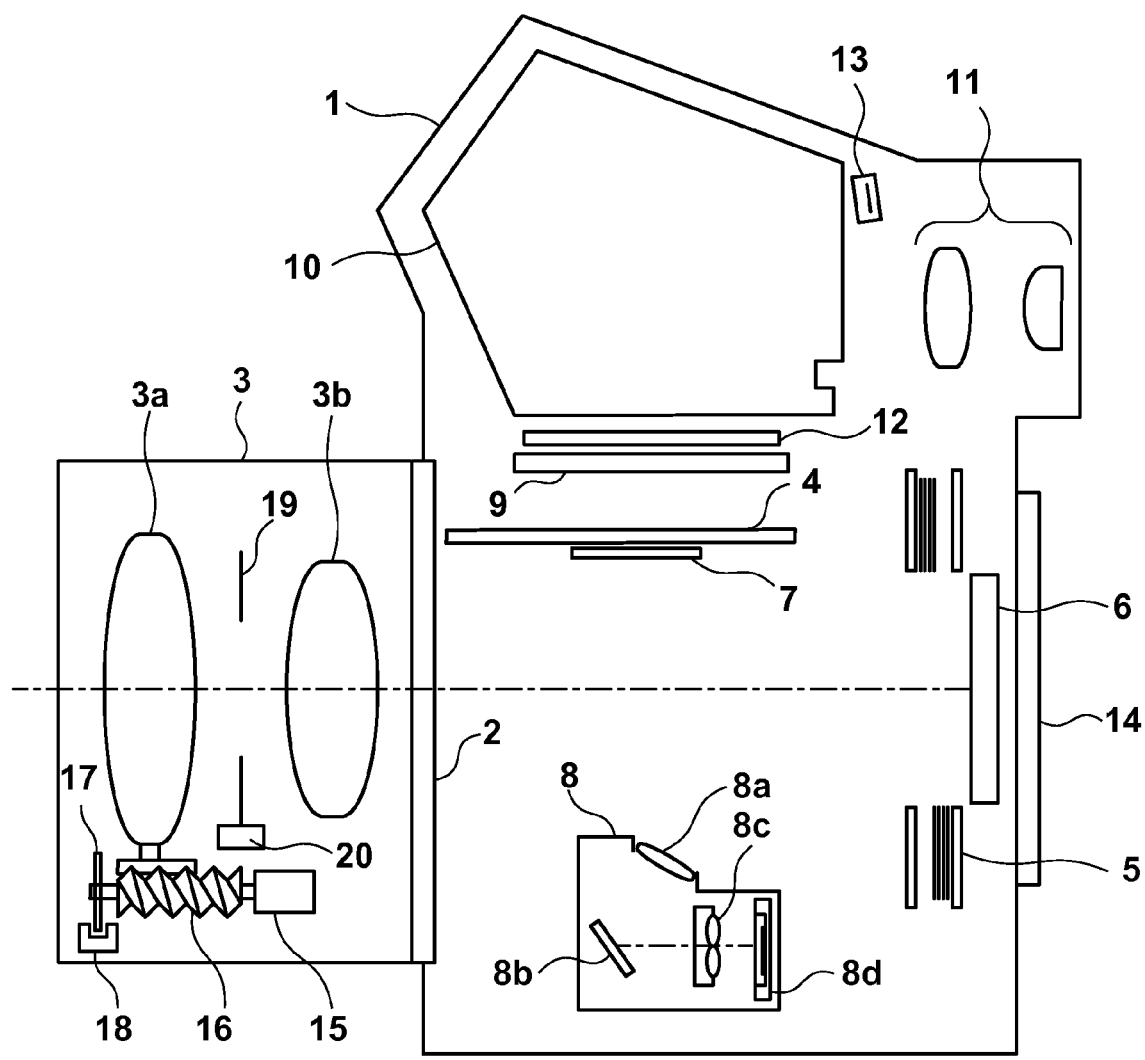
FIG. 2 is a sectional view showing the arrangement of the digital single-lens reflex camera (in a mirror-up/live view state) according to the first embodiment.

FIGS. 1 and 2 are views showing the arrangement of a digital single-lens reflex camera as the first embodiment of an image capturing apparatus of the present invention.

Referring to FIGS. 1 and 2, a digital single-lens reflex camera body 1 (to be referred to as a camera body) is shown. An interchangeable lens 3 is detachably and interchangeably mounted on a mount 2 fixed on the camera body 1. In addition, the mount 2 is provided with an interface unit (not shown) for communicating various types of signals with the interchangeable lens 3 and supplying power from the camera body 1 to the interchangeable lens 3.

The interchangeable lens 3 accommodates an imaging optical system including a focus lens (focus element) 3a, a variable magnification lens 3b, and a stop 19. Although FIGS. 1 and 2 show each lens as if it were formed from one lens, each lens may be constituted by a plurality of lenses.

In the camera body 1, a main mirror 4 formed from a half mirror can pivot between the down position shown in FIG. 1 and the up position shown in FIG. 2. When observing the object image formed by the imaging optical system through a viewfinder optical system to be described later (viewfinder observation state), the main mirror 4 pivots to the down position where it is obliquely arranged in an imaging optical path as shown in FIG. 1. The main mirror 4 arranged at the down position reflects a light beam from the imaging optical system and guides the light to the viewfinder optical system. When performing imaging or live view display (imaging/live view observation state), the main mirror 4 pivots to the up position where it retracts from the imaging optical path as shown in FIG. 2. This guides a light beam from the imaging optical system to a shutter 5 and an image sensor 6 (both of which will be described later).

The shutter 5 controls exposure of the image sensor 6 to a light beam from the imaging optical system. The shutter 5 in this embodiment is a focal plane shutter and configured to close in the viewfinder observation state and open in the imaging/live view observation state.

The image sensor 6 is constituted by a CCD or CMOS image sensor and its peripheral circuit. The image sensor 6 photoelectrically converts an object image and outputs the image-capturing signal. An image processing circuit 54 to be described later (see FIG. 3) performs various types of processing for the image capturing signal to generate an image signal. All the pixels are configured to independently output image capturing signals. Some of the pixels serve as focus detection pixels, which enables focus detection based on the phase difference detection method at the image capturing plane (image capturing plane phase difference AF). More specifically, the image sensor 6 includes a plurality of image capturing pixels each of which receives a light beam passing through the entire area of the exit pupil of the interchangeable lens 3 which forms an image of an object, thereby generating an image of the object. The image sensor 6 further includes a plurality of focus detection pixels each of which receives a light beam passing through a partial area of the exit pupil of the interchangeable lens 3. The plurality of focus detection pixels can receive light beams passing through the entire region of the exit pupil of the interchangeable lens 3 as a whole. The focus detection pixels are discretely arranged in effective pixels to perform image capturing plane phase difference AF in the entire area of the image sensor 6. Image capturing plane phase difference AF has been described in detail in Japanese Patent Laid-Open Nos. 2009-244429 and 2010-117680, and hence a detailed description of it will be omitted.

A sub-mirror 7 which pivots together with the main mirror 4 reflects a light beam transmitted through the main mirror 4 and guides the light beam to an AF unit 8 to be described later when the main mirror 4 is arranged at the down position. The sub-mirror 7 pivots to the up position together with the main mirror 4 in the imaging/live view observation state.

The AF unit 8 is constituted by a field lens 8a arranged near an image forming plane, a reflection mirror 8b, a secondary image forming lens 8c, and an area sensor 8d including a plurality of light-receiving elements arranged in a two-dimensional direction. The secondary image forming lens 8c forms a pair of object images from a light beam entering from the imaging optical system and reflected by the main mirror 4, the sub-mirror 7, and the reflection mirror 8b. The area sensor 8d generates a pair of image signals by photoelectrically converting the pair of object images. The pair of image signals are output to a focus detection circuit 36 to be described later (see FIG. 3). It is possible to detect the focus state of the imaging optical system (that is, focus detection) by the phase difference detection method. The secondary image forming lens 8c is configured to form a pair of object images with respect to each of objects included in a plurality of areas within the imaging frame. That is, a plurality of focus detection points (so-called distance measurement points) are arranged within the imaging frame. In this embodiment, 61 distance measurement points are arranged in this embodiment (see FIG. 7).

An object image is formed on a focus plate 9 by a light beam reflected by the main mirror 4. A pentaprism 10 inverts the object image formed on the exit plane of the focus plate 9 into an erect normal image. An eyepiece lens 11 guides a light beam from the pentaprism 10 to an eye of a user to make him/her observe the object image on the focus plate 9. An optical system constituted by the focus plate 9, the pentaprism 10, and the eyepiece lens 11 is called a viewfinder optical system.

A display device 12 formed from a polymer dispersed liquid crystal panel (so-called PN liquid crystal panel) arranged near the focus plate 9 inside the viewfinder optical system displays various types of information such as 61 distance measurement points described above inside the viewfinder.

An RGB photometric sensor 13 formed from an image sensor such as a CMOS sensor or CCD can perform photometry of the luminance (so-called AE) of an object image on the focus plate 9 and color measurement from an image capturing signal, face detection by generating an image from the image capturing signal, and the like in cooperation with a photometric optical system (not shown).

A liquid crystal monitor 14 provided outside the camera body displays image signals (a live view image and a shot image) and various types of information.

In the interchangeable lens 3, a focus motor 15 serves as a drive source which moves the focus lens 3a in the optical axis direction. The focus motor 15 rotates a lead screw 16. A rack mounted on the focus lens 3a (mounted on a holding frame holding the focus lens 3a in practice) meshes with the lead screw 16. For this reason, when the focus motor 15 rotates the lead screw 16, the focus lens 3a moves in the optical axis direction as the lead screw 16 meshes with the rack.

A pulse plate 17 is mounted on the distal end of the lead screw 16 so as to be rotatable together with the lead screw 16. In addition, a photocoupler 18 including a light-emitting element and a light-receiving element which are arranged to sandwich part of the pulse plate 17 is arranged in the interchangeable lens 3. The photocoupler 18 generates a pulse signal every time the light-receiving element receives light from the light-emitting element as the pulse plate 17 rotates. This pulse signal is input to a focus adjustment circuit 34 to be described later (see FIG. 3). Counting the number of input pulse signals will detect the movement amount (or position) of the focus lens 3a.

A stop driving unit 20 includes a stop driving circuit 35 to be described later (see FIG. 3) and drives the stop 19 in the opening and closing directions.

Figure 3:
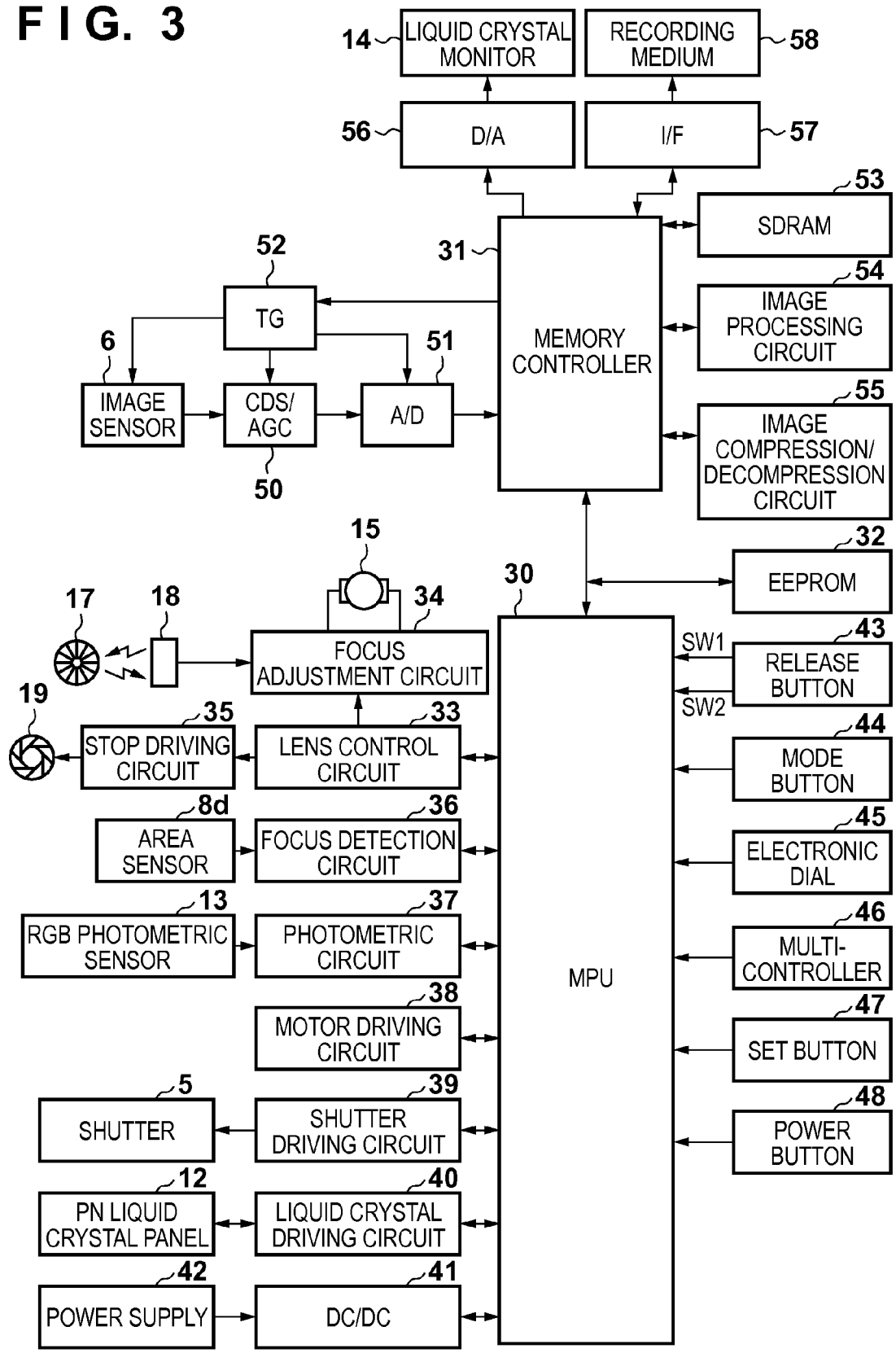
FIG. 3 is a block diagram showing the electrical arrangement of the digital single-lens reflex camera according to the first embodiment.

FIG. 3 is a block diagram showing the electrical arrangement of the above digital single-lens reflex camera. A microcomputer (to be referred to as an MPU hereinafter) 30 is a main controller which controls the camera body 1 and the overall camera system. A memory controller 31 performs control concerning the operation of the image sensor 6 and image data. An EEPROM 32 serving as a memory stores data for various types of control.

A lens control circuit 33 provided in the interchangeable lens 3 controls the focus adjustment circuit 34 and the stop driving circuit 35 in the interchangeable lens 3 in accordance with signals from the MPU 30 which are transmitted via the mount 2.

The focus adjustment circuit 34 receives information indicating the target movement amount of the focus lens 3a from the lens control circuit 33, and also receives a pulse signal from the photocoupler 18 (actual movement amount information indicating the actual movement amount of the focus lens 3a). The focus adjustment circuit 34 drives the focus motor 15 to move the focus lens 3a based on the target movement amount information and the actual movement amount information. The stop driving circuit 35 drives the stop 19 in accordance with a stop driving signal from the lens control circuit 33.

The focus detection circuit 36 in the camera body 1 controls electric charge accumulation and electric charge readout of the area sensor 8d provided in the AF unit 8 to output a pair of image signals obtained in each focus detection area to the MPU 30. The MPU 30 calculates the phase difference between a pair of input image signals by performing correlation computation with respect to the pair of image signals, and also calculates a defocus amount indicating the focus state of the imaging optical system from the phase difference. The MPU 30 then calculates the in-focus position of the focus lens 3a based on optical data such as the defocus amount, the focal length of the imaging optical system acquired from the interchangeable lens 3 (lens control circuit 33), and the focus sensitivity of the focus lens 3a. The in-focus position (first in-focus position) obtained by the phase difference detection method will be referred to as the phase difference in-focus position in the following description. The MPU 30 transmits the information of the phase difference in-focus position to the lens control circuit 33. The AF unit 8, the focus detection circuit 36, and the MPU 30 constitute a focus control unit.

The lens control circuit 33 calculates a target movement amount for the focus lens 3a which is used to move the focus lens 3a from the current position to the phase difference in-focus position, and outputs the target movement amount information to the focus adjustment circuit 34. As described above, with this operation, the focus adjustment circuit 34 drives the focus motor 15 (not shown) and moves the focus lens 3a to the phase difference in-focus position. In this manner, focus detection based on the phase difference detection method and phase difference AF including focus adjustment are formed.

A photometric circuit 37 outputs a luminance signal from the RGB photometric sensor 13 to the MPU 30. The MPU 30 A/D-converts the luminance signal into the photometric information of the object, and computes and sets an imaging exposure by using the photometric information. A series of operations from obtaining this photometric information to setting the imaging exposure will be referred to as AE operation. Likewise, the color information of the object is obtained from an RGB signal, and face detection is performed from an image capturing signal.

A motor driving circuit 38 controls a mirror motor (not shown) which drives the main mirror 4 and a charge motor (not shown) which charges the shutter 5. A shutter driving circuit 39 controls power supply to an electromagnet (coil) (not shown) which holds the shutter 5 in a charged state.

A liquid crystal driving circuit 40 performs drive control on the PN liquid crystal panel 12 to display distance measurement points and various types of information in the viewfinder. A DC/DC converter 41 converts the voltage of a power supply (battery) 42 into a voltage necessary for each circuit in the camera body 1 and the interchangeable lens 3. The power supply 42 is detachable with respect to the camera body 1.

A release button 43 is an operation member which is operated by the user to start imaging. Half-pressing (first stroke operation) the release button 43 will turn on a first switch SW1 for starting imaging preparation operations such as AE and AF. Fully pressing (second stroke operation) the release button 43 will turn on a second switch SW2 for starting exposure of the image sensor 6 for the generation of a recording image. ON signals from the first switch SW1 and the second switch SW2 are output to the MPU 30.

Operating a mode button 44 together with an electronic dial 45 makes it possible to change the imaging mode in the camera body 1. An up/down counter in the MPU 30 counts click signals corresponding to the rotating operation amount of the electronic dial 45. Various types of numerical values, data, and the like are selected in accordance with count values.

A multi-controller 46 is an operation input unit for selecting or setting distance measurement points and details of various types of imaging modes by making the user operate eight button portions provided on the upper, lower, left and right sides and between them.

A SET button 47 is an operation input unit for deciding selections and settings made concerning distance measurement points, details of various types of imaging modes, and various types of numerical values when the user operates the mode button 44, the electronic dial 45, the multi-controller 46, and the like. When the user operates a power button 48, the power supply of the camera body 1 (and the interchangeable lens 3) is turned on/off.

A CDS (Correlation Double Sampling)/AGC (Automatic Gain Control) circuit 50 performs sampling/holding and automatic gain control for the image capturing signal output from the image sensor 6. An A/D converter 51 converts an analog output from the CDS/AGC circuit 50 into a digital signal. A TG (Timing Generation) circuit 52 supplies a drive timing signal to the image sensor 6, a sample hold timing signal to the CDS/AGC circuit 50, and a sample clock signal to the A/D converter 51.

The memory controller 31 detects the in-focus position of the focus lens 3a by the contrast detection method using the image capturing signal output from the image sensor 6 and output from the CDS/AGC circuit 50 and the A/D converter 51. The in-focus position (second in-focus position) detected by the contrast detection method will be referred to as a contrast in-focus position in the following description. The MPU 30 performs focus calibration for correcting a phase difference in-focus position based on the difference between the contrast in-focus position and the phase difference in-focus position described above. The MPU 30 and the memory controller 31 constitute a calibration unit.

In addition, the memory controller 31 performs the same processing as that performed by the phase difference detection method calculated by the MPU 30 using output signals from the focus detection pixels of the image sensor 6, and detects the in-focus position of the focus lens 3a by the image capturing plane phase difference detection method. The in-focus position (third in-focus position) obtained by this image capturing plane phase difference detection method will be referred to as an image capturing plane phase difference in-focus position in the following description.

An SDRAM 53 as a memory temporarily records data such as the image digitally converted by the A/D converter 51 and output signals from the focus detection pixels of the image sensor 6. The image processing circuit 54 generates image data for live view or recording by performing various types of processing such as Y/C (luminance signal/color difference signal) separation, white balance correction, and γ correction for the image capturing signal (digital signal) output from the A/D converter 51. The memory controller 31 can also obtain the photometric information of the object (so-called image capturing plane AE) from the image data generated by the image processing circuit 54.

An image compression/decompression circuit 55 decompresses the image data obtained by compressing image data according to a format such as JPEG. A D/A converter 56 converts image data into an analog signal to display image data recorded in an SDRAM 53 or a recording medium 58 on the liquid crystal monitor 14. An I/F (interface) 57 is an interface with the recording medium 58.

Figure 4:
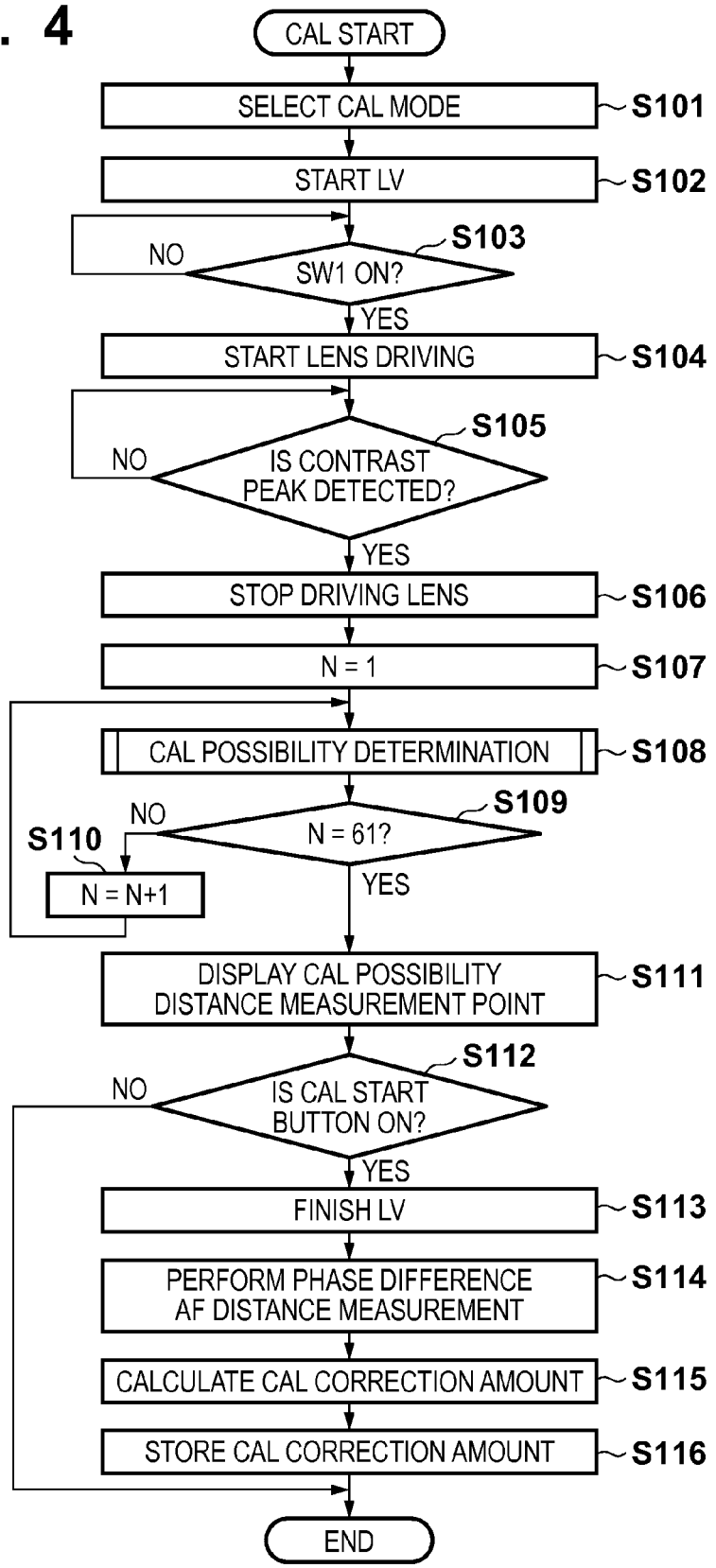
FIG. 4 is a flowchart showing a focus calibration operation in the first embodiment.

The operation of the digital single-lens reflex camera according to this embodiment will be described next with reference to the flowcharts shown in FIGS. 4 and 5. The flowchart of FIG. 4 shows an operation performed in the normal calibration mode for focus calibration. The normal calibration mode is a mode of simultaneously performing focus calibration with respect to a plurality of distance measurement points at a given position of the focus lens 3a. The MPU 30 and the memory controller 31, both of which are computers, execute the operations shown in FIGS. 4 and 5 in accordance with computer programs.

In step S101, the MPU 30 advances to step S102 when the user selects the normal calibration mode by operating the mode button 44 and the electronic dial 45.

In step S102, the MPU 30 starts live view (LV) display to perform focus calibration. More specifically, the MPU 30 controls the mirror motor (not shown) via the motor driving circuit 38 to make the main mirror 4 and the sub-mirror 7 pivot to the up position and retract outside the imaging optical path. In addition, the MPU 30 drives the charge motor (not shown) via the shutter driving circuit 39 to set the shutter 5 in an open state as shown in FIG. 2. The memory controller 31 then causes the image sensor 6 to start photoelectric conversion (electric charge accumulation and electric charge readout), and causes the liquid crystal monitor 14 to display the live view image as the moving image generated by the image processing circuit 54 using the image capturing signal read out from the image sensor 6. The user searches for an object for focus calibration while seeing this live view image, and arranges the camera.

Figure 6:
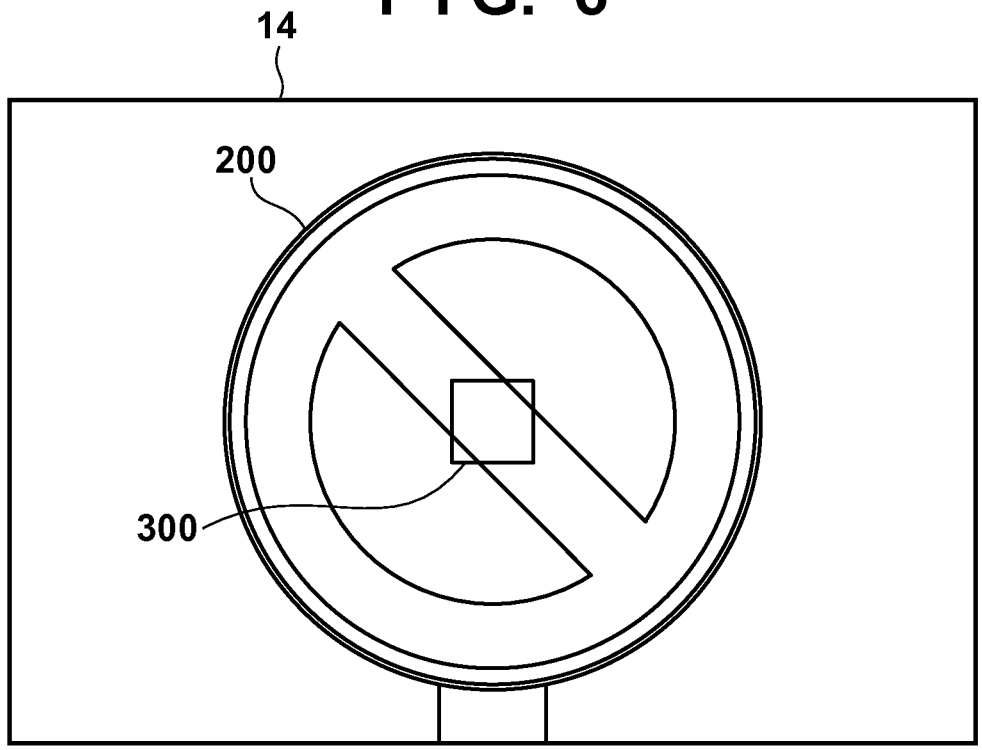
FIG. 6 is a view showing a display state of a liquid crystal monitor in the live view mode in the first embodiment.

FIG. 6 is a view showing the display state of the liquid crystal monitor 14 in the live view mode. The liquid crystal monitor 14 is displaying a traffic sign 200 as a live view image. A TVAF frame 300 is displayed in the center of the imaging screen. Although the TVAF frame 300 is arranged in the center of the imaging screen in FIG. 6, the TVAF frame 300 may be arranged at any position on the imaging screen.

In step S103, the MPU 30 determines whether the user has half-pressed the release button 43 to turn on the first switch SW1. If YES in step S103, an object subjected to focus calibration is confirmed. The process then advances to step S104. If NO in step S103, the process waits until the first switch SW1 is turned on.

In step S104, the MPU 30 drives the focus motor 15 via the lens control circuit 33 to start driving the focus lens 3a in increments of a predetermined amount.

In step S105, the contrast in-focus position of the focus lens 3a is detected by the contrast detection method. More specifically, first of all, the memory controller 31 reads out an image capturing signal in the TVAF frame 300 from the image sensor 6, and extracts a predetermined frequency component from the signal, thereby generating a contrast evaluation signal. The memory controller 31 then temporarily records the signal in the SDRAM 53. The memory controller 31 determines whether an image exhibiting maximum (peak) contrast (to be referred to as a peak image hereinafter) has been obtained. If a peak image can be detected, the process advances to step S106. If a peak image cannot be detected, a peak image is repeatedly detected at a position to which the focus lens 3a is driven by a predetermined amount. Since a peak image cannot be detected unless at least three contrast evaluation images are acquired, step S105 is repeated at least three times.

In step S106, the MPU 30 stops the focus motor 15 via the lens control circuit 33 to finish driving the focus lens 3a. At this time point, the focus lens 3a is at rest at a position (contrast in-focus position) where the traffic sign 200 as an object subjected to focus calibration is in focus.

In step S107, 1 is set in a counter N for counting 61 distance measurement points of the area sensor 8d. In step S108, the focus calibration possibility determination routine is executed. A detailed operation in this routine will be described later.

In step S109, it is determined whether the focus calibration possibility determination routine has been executed with respect to the 61st distance measurement point, that is, has been completed with respect to all the distance measurement points. If YES in step S109, the process advances to step S111. If NO in step S109, the process advances to step S110. In step S110, 1 is added to the counter N, and step S108 is repeated.

In step S111, the memory controller 31 causes the liquid crystal monitor 14 to display focus calibration possibility determination results on all the distance measurement points of the area sensor 8d. The focus calibration possibility determination results can be discriminated by CAL_OK_FLAG or CAL_NG_FLAG temporarily recorded in the SDRAM 53 in the focus calibration possibility determination routine described later.

Figure 7:
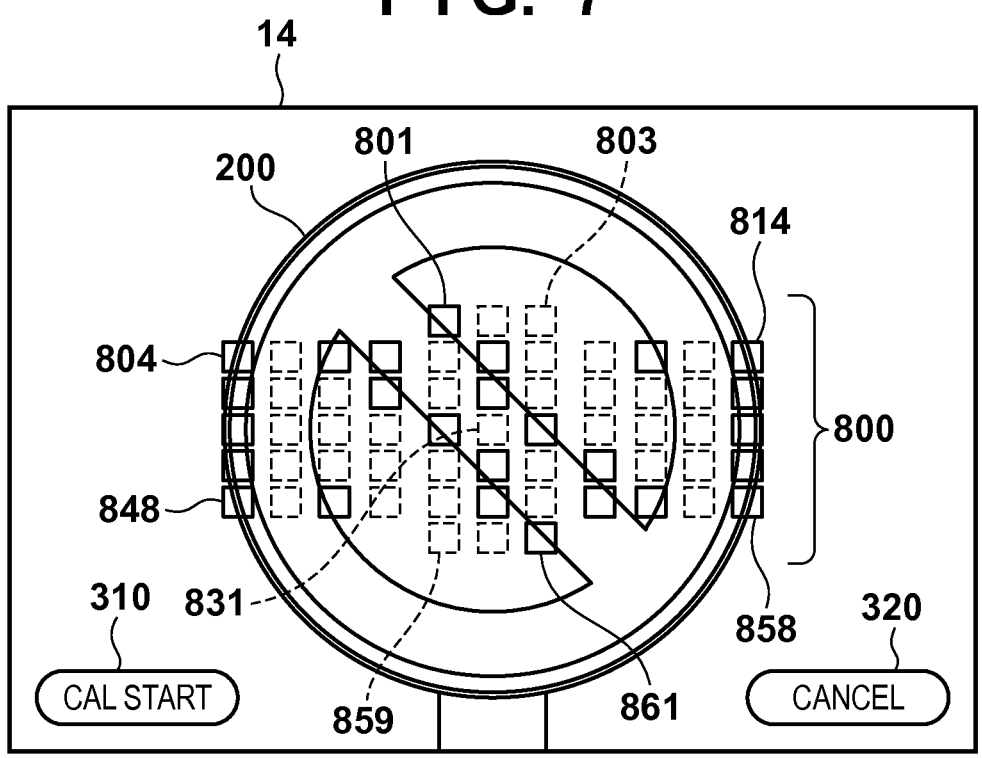
FIG. 7 is a view showing focus calibration possibility determination result display in the first embodiment.

FIG. 7 is a view showing a state in which focus calibration possibility determination results are displayed on the liquid crystal monitor 14. AF frames 800 indicating 61 distance measurement points of the area sensor 8d are displayed. The individual numbers of the AF frames 800 are counted from the left end to the right end, and from the upper side to the lower side, starting from an AF frame 801 on the upper left, with the central frame being an AF frame 831 and the lower right frame being an AF frame 861. Therefore, the first distance measurement point of the counter N corresponds to an AF frame 801, and the 61st distance measurement point corresponds to an AF frame 861. In addition, a CAL start button 310 and a cancel button 320 are displayed.

AF frames indicating distance measurement points where focus calibration can be performed are displayed in solid lines (801, 804, 814, 848, 858, 861, and the like). AF frames indicating distance measurement points where focus calibration cannot be performed are displayed in dotted lines (803, 831, 859, and the like) so as to be identifiable. Referring to FIG. 7, the focus calibration possibilities of the respective distance measurement points are indicated by the solid and dotted lines of AF frames (differences in line types or line widths). However, it is possible to use any display method which allows the user to visually determine possibilities, for example, by changing the display colors of AF frames or displaying and hiding (or blinking) AF frames.

In step S112, the MPU 30 determines whether the user has turned on the CAL start button 310. More specifically, if the user operates the SET button 47 upon selecting the CAL start button 310 by operating the electronic dial 45 or the multi-controller 46, the CAL start button is turned on, and the process advances to step S113. If the CAL start button 310 is not turned on (that is, the cancel button 320 is turned on), the focus calibration mode is finished.

In step S113, the live view display is finished. More specifically, the MPU 30 controls the mirror motor (not shown) via the motor driving circuit 38 to make the main mirror 4 and the sub-mirror 7 pivot to the down position shown in FIG. 2.

In step S114, the MPU 30 performs focus detection by the phase difference detection method via the focus detection circuit 36 with respect to a distance measurement point determined as a focus calibration possible distance measurement point, and calculates a phase difference in-focus position based on the result. The MPU 30 temporarily records the position in the SDRAM 53.

In step S115, the MPU 30 calculates the difference between the contrast in-focus position obtained in step S105 and the phase difference in-focus position of the focus calibration possible distance measurement point obtained in step S114. This difference is a correction amount (to be referred to as a CAL correction amount hereinafter) for the phase difference in-focus position of the focus calibration possible distance measurement point.

In step S116, the MPU 30 records, in the EEPROM 32, the calculated CAL correction amount for the focus calibration possible distance measurement point, and terminates the operation in the calibration mode.

Figure 5:
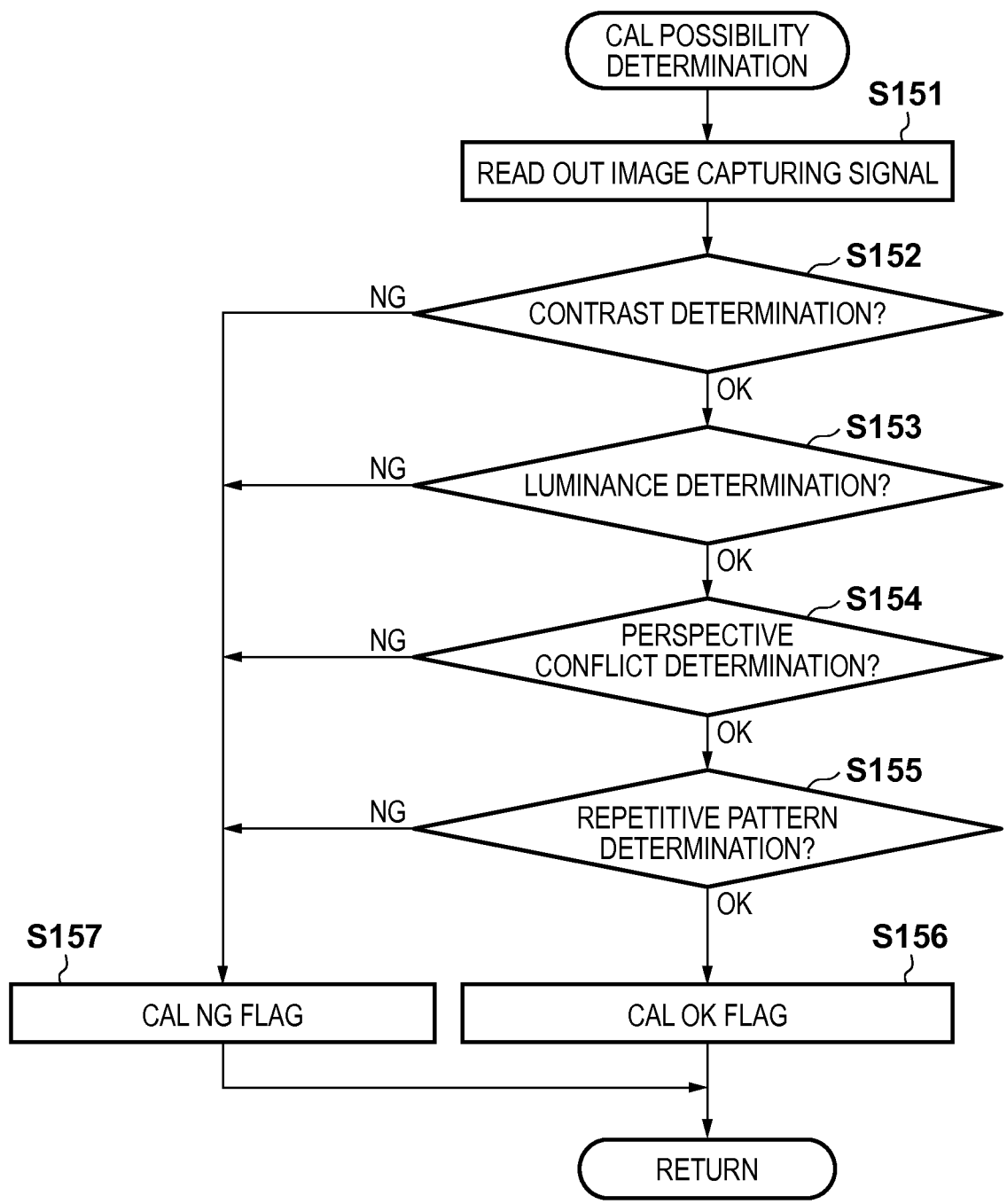
FIG. 5 is a flowchart showing an operation in a focus calibration possibility determination routine in the first embodiment.

The flowchart of FIG. 5 shows an operation performed in the focus calibration possibility determination routine. This operation is performed before or during focus calibration.

In step S151, the memory controller 31 reads out an image capturing signal in an AF frame 8NN as the Nth distance measurement point from the image sensor 6, and generates an evaluation image. In step S152, the memory controller 31 determines whether the contrast of the evaluation image is equal to or more than a predetermined value. If the contrast is equal to or more than the predetermined value, the process advances to step S153. If the contrast is less than the predetermined value, the process advances to step S157.

In step S153, it is determined whether the luminance of the evaluation image falls within a predetermined range. If YES in step S153, the process advances to step S154. If NO in step S153, the process advances to step S157.

In step S154, it is determined whether there are any objects exhibiting the conflict of perspective in the evaluation image. If NO in step S154, the process advances to step S155. If YES in step S154, the process advances to step S157.

In step S155, it is determined whether the evaluation image exhibits a repetitive pattern. If NO in step S155, the process advances to step S156. If YES in step S155, the process advances to step S157.

If OK is determined in all four steps S152 to S155, accurate distance measurement can be done by phase difference AF in step S114. In step S156, therefore, it is determined that focus calibration can be performed with respect to the Nth distance measurement point. The MPU 30 then temporarily records the result on the Nth distance measurement point (AF frame 8NN) as CAL_OK_FLAG in the SDRAM 53.

If NG is determined in any one of steps S152 to S155, phase difference AF may result in a distance measurement error or incapability to perform distance measurement in step S114. In step S157, therefore, it is determined that focus calibration cannot be performed with respect to the Nth distance measurement point. The MPU 30 then temporarily records the result on the Nth distance measurement point (AF frame 8NN) as CAL_NG_FLAG in the SDRAM 53. The process then returns to step S109.

Referring to FIG. 7, since the object is the traffic sign 200, OK is determined concerning all the AF frames 801 to 861 in the three determinations (object determination): whether the luminance falls within the predetermined range, whether there are no objects exhibiting the conflict of perspective, and whether the image is not a repetitive pattern. However, the contrast differs depending on the position of an AF frame arranged on the traffic sign 200. As described above, the AF frames 801, 804, 814, 848, 858, 861, and the like exhibit changes in design inside the AF frames (include color switching edge lines). For this reason, the contrast of each AF frame becomes equal to or more than a predetermined value, and CAL_OK_FLAG is recorded. In contrast, the AF frames 803, 831, 859, and the like exhibit no changes in design inside the AF frames (include no color switching edge lines). For this reason, the contrast of each AF frame becomes less than a predetermined value, and CAL_NG_FLAG is recorded.

Referring to FIG. 5, whether focus detection can be performed by the phase difference detection method is determined by the four determination methods, that is, contrast determination, luminance determination, perspective conflict determination, and repetitive pattern determination using an image capturing signal from the image sensor 6. However, it is possible to use any determination method which can determine an object from which it is difficult to obtain high focus detection accuracy by the phase difference detection method. For example, it is possible to use a method using color determination or a method based on determination of whether an in-focus state is obtained by performing image capturing plane phase difference AF of the image sensor 6.

As described above, according to this embodiment, whether focus calibration can be performed with respect to the object selected by the user is determined by using an image capturing signal from the image sensor 6. This can prevent any wasteful correcting operation with respect to an object from which sufficient focus calibration accuracy cannot be obtained. Therefore, the user can easily and efficiently perform focus calibration without using any dedicated chart.

Second Embodiment

Figure 8:
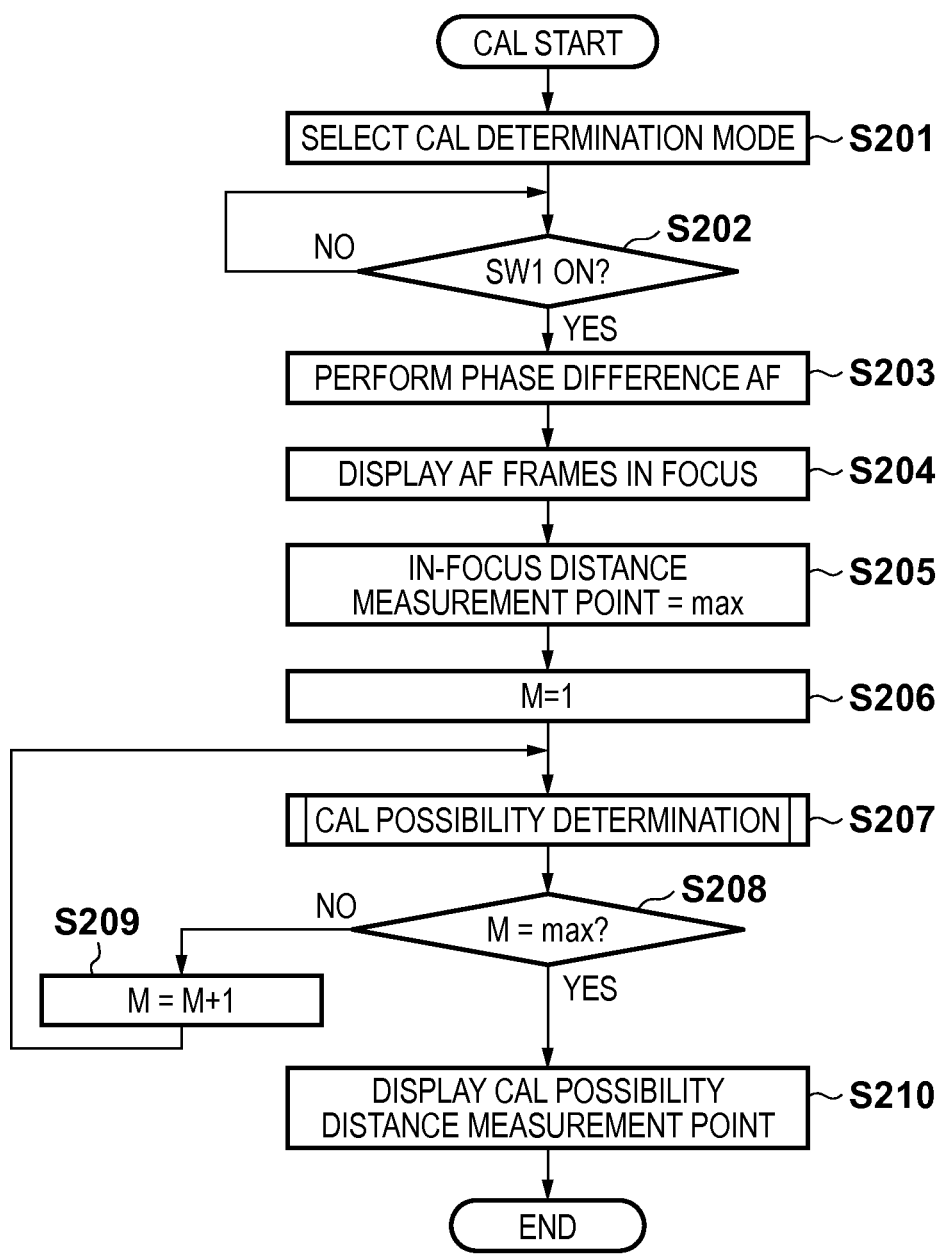
FIG. 8 is a flowchart showing a focus calibration operation in the second embodiment.

The operation of a digital single-lens reflex camera according to this embodiment will be described with reference to the flowcharts shown in FIGS. 8 and 9. The flowchart of FIG. 8 shows an operation performed in a calibration determination mode of determining whether focus calibration can be performed in a digital single-lens reflex camera system including the digital single-lens reflex camera according to the second embodiment of the present invention and an interchangeable lens. The arrangements of the camera body and the interchangeable lens according to this embodiment are the same as those in the first embodiment, and the same reference numerals as those in the first embodiment denote constituent elements common to those of the first embodiment. An MPU 30 and a memory controller 31, both of which are computers, execute the operations shown in FIGS. 8 and 9 in accordance with computer programs.

In step S201, when the MPU 30 detects that the user has selected the calibration determination mode by operating a mode button 44 and an electronic dial 45, the process advances to step S202. The calibration determination mode in this embodiment is a mode performed on the viewfinder, and hence the user searches for an object subjected to focus calibration while seeing the viewfinder.

In step S202, the MPU 30 determines whether the user has half-pressed a release button 43 to turn on a first switch SW1. If YES in step S202, an object subjected to focus calibration determination is confirmed. The process then advances to step S203. If NO in step S202, the process waits until the first switch SW1 is turned on.

In step S203, the MPU 30 focuses/drives a focus lens 3a to the phase difference in-focus position obtained by the phase difference detection method. More specifically, the MPU 30 performs, via a focus detection circuit 36, focus detection by the phase difference detection method at a distance measurement point corresponding to a setting made in the camera at this time. With regard to distance measurement points subjected to focus detection, if, for example, a distance measurement point selection mode is designed to select one arbitrary point, focus detection is performed at the distance measurement point selected in advance by the user, whereas if distance measurement points are to be automatically selected, focus detection is performed at all the 61 points. The MPU 30 decides a main distance measurement point based on the focus detection result, lens information, and the like. The MPU 30 then calculates a phase difference in-focus position based on the focus detection result, and transmits the calculated information to a lens control circuit 33. The lens control circuit 33 calculates the movement amount of the focus lens 3a and drives the focus lens 3a to the phase difference in-focus position via a focus adjustment circuit 34.

In step S203, the MPU 30 performs focus detection by the phase difference detection method via a focus detection circuit 36 with respect to all the distance measurement points of an area sensor 8d at the stop position of the focus lens 3a. The MPU 30 displays an AF frame indicating the distance measurement point in focus on a PN liquid crystal panel 12 via a liquid crystal driving circuit 40 based on the focus detection result.

Figure 10:
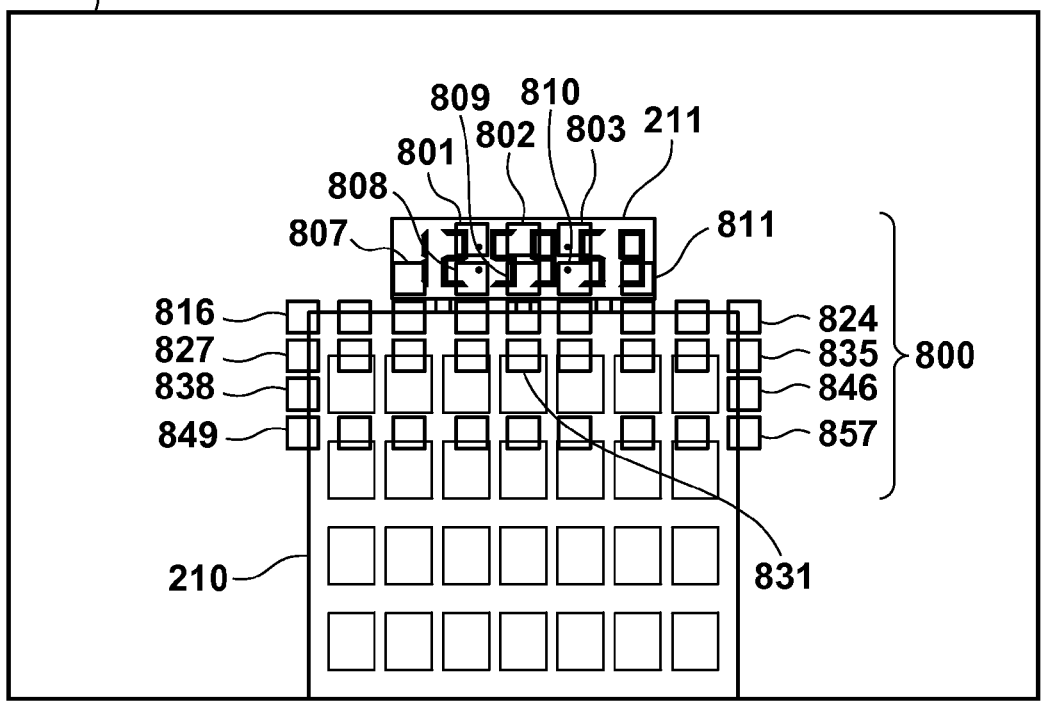
FIG. 10 is a view showing a display state in a viewfinder in the second embodiment.

FIG. 10 is a view showing a display state in the viewfinder. The object image formed on a focus plate 9 and various types of information displayed on the PN liquid crystal panel 12 are currently displayed through a viewfinder optical system. The object whose image is formed on the focus plate 9 is a building 210 having an electronic time board 211 installed on the rooftop. AF frames 800 (801 to 803, 807 to 811, 816, 824, 827, 831, 835, 838, 846, 849, 857, and the like) indicating distance measurement points in focus are displayed on the PN liquid crystal panel 12.

In step S205, the MPU 30 counts the distance measurement points in focus and sets the count as a counter max value. Referring to FIG. 10, since the number of AF frames, of all the 61 distance measurement points, which are displayed in focus is 37, max=37.

In step S206, 1 is set in a counter M for counting distance measurement points subjected to focus calibration possibility determination. In step S207, a focus calibration possibility determination routine is executed. The detailed operation in this routine will be described later.

In step S208, it is determined whether the focus calibration possibility determination routine has been completed up to the distance measurement point corresponding to the counter max value. If YES in step S208, the process advances to step S210. If NO in step S208, the process advances to step S209. In step S209, 1 is added to the counter M to repeat step S207.

In step S210, the memory controller 31 displays focus calibration possibility determination results on the PN liquid crystal panel 12, and terminates the operation in the calibration determination mode. The focus calibration possibility determination results can be discriminated by CAL_OK_FLAG or CAL_NG_FLAG temporarily recorded in an SDRAM 53 in the focus calibration possibility determination routine described later.

Figure 11:
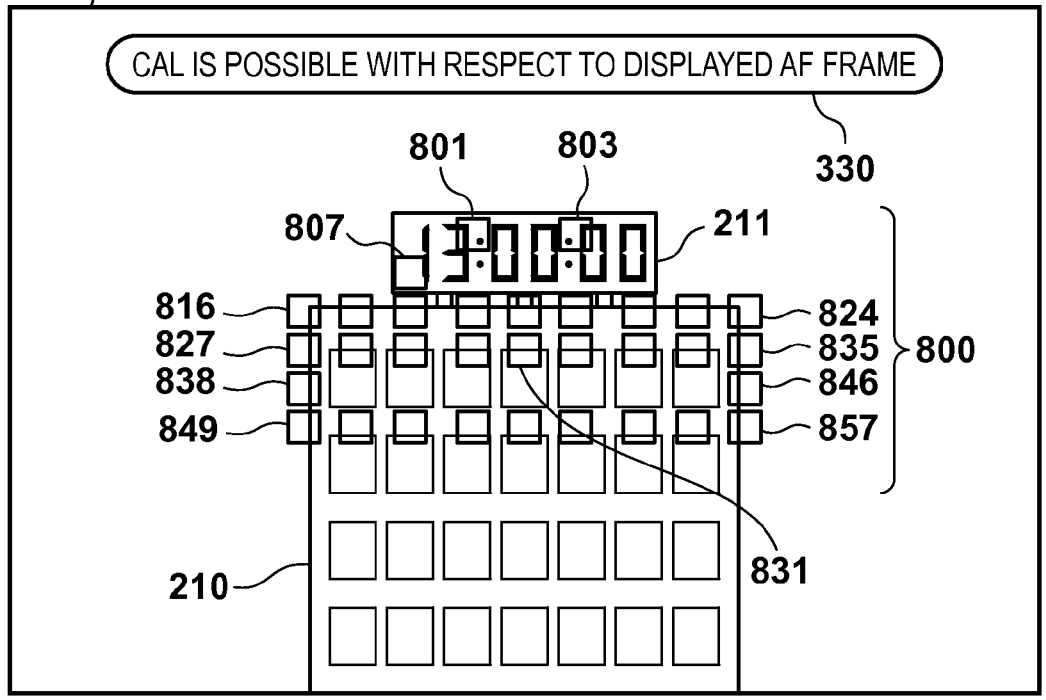
FIG. 11 is a view showing focus calibration possibility determination result display in the second embodiment.

FIG. 11 is a view showing a state in which focus calibration possibility determination results are displayed on the PN liquid crystal panel 12. Out of the AF frames 800 displayed in focus in step S204, the AF frames 802 and 806 to 811 whose focus calibration possibility determination results are NG are unlighted. The AF frames 801, 803, 807, 816, 824, 827, 831, 835, 838, 846, 849, 857, and the like which are continuously lighted indicate that focus calibration is possible. In addition, a message 330 is displayed to allow the user to easily know that the focus calibration possibility determination results are displayed.

Referring to FIG. 11, focus calibration possibility at each distance measurement point is indicated by lighting (displaying) or unlighting (hiding) the corresponding AF frame. However, it is possible to use any display method which allows the user to visually determine possibilities, for example, changing the display colors of AF frames or displaying AF frames in solid lines and dotted lines. In addition, the text of message 330 is not limited to that in this embodiment, and any kind of text may be used. Furthermore, marks indicating focus calibration possibilities may be displayed.

Figure 9:
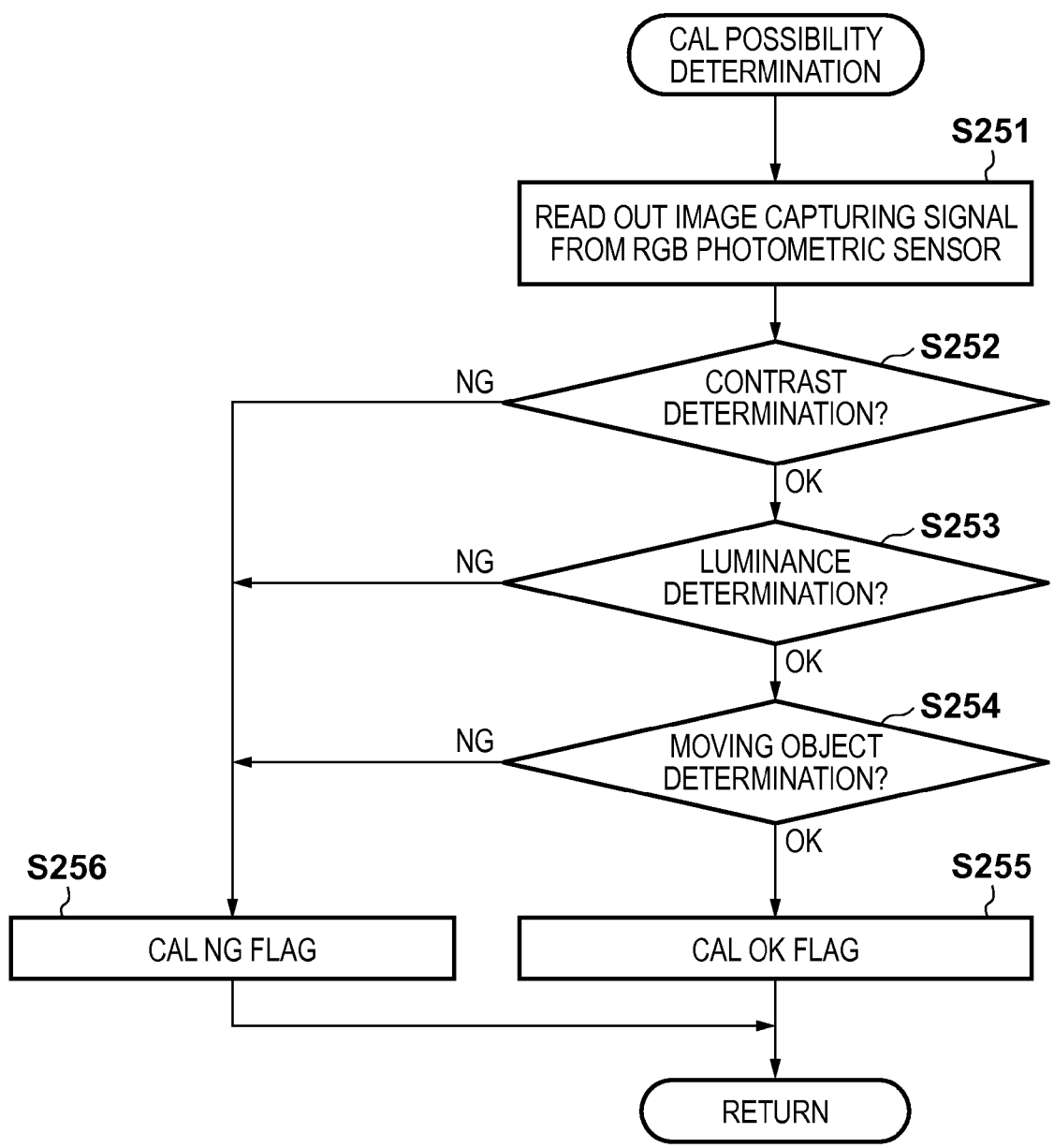
FIG. 9 is a flowchart showing an operation in a focus calibration possibility determination routine in the second embodiment.

The flowchart of FIG. 9 shows an operation in the focus calibration possibility determination routine.

In step S251, the memory controller 31 reads out an image capturing signal in an AF frame 8MM as the Mth distance measurement point from an RGB photometric sensor 13 via a photometric circuit 37, and generates an evaluation image.

In step S252, it is determined whether the contrast of the evaluation image is equal to or more than a predetermined value. If the contrast is equal to or more than the predetermined value, the process advances to step S253. If the contrast is less than the predetermined value, the process advances to step S256. In step S253, it is determined whether the luminance of the evaluation image falls within a predetermined range. If the luminance falls within the predetermined range, the process advances to step S254. If the luminance falls outside the predetermined range, the process advances to step S256.

In step S254, it is determined whether the object is moving, by checking whether a signal representing the contrast or luminance of the evaluation image varies or fluctuates beyond a predetermined value or more. If NO in step S254, the process advances to step S255. If YES in step S254, the process advances to step S256.

If OK is determined in all the three determinations in steps S252 to S254, accurate distance measurement can be performed by TVAF performed by an image sensor 6. In step S255, therefore, it is determined that focus calibration can be performed at the Mth distance measurement point. The MPU 30 then temporarily records the result on the Mth distance measurement point (AF frame 8MM) as CAL_OK_FLAG in the SDRAM 53.

If NG is determined in any one of the three determinations in steps S252 to S254, TVAF performed by the image sensor 6 may result in a distance measurement error or incapability to perform distance measurement. In step S256, therefore, it is determined that focus calibration cannot be performed at the Mth distance measurement point. The MPU 30 then temporarily records the result on the Mth distance measurement point (AF frame 8MM) as CAL_NG_FLAG in the SDRAM 53. The process then returns to step S208.

Referring to FIG. 10, with regard to the AF frames set in focus by phase difference AF (displayed on the PN liquid crystal panel 12), OK is determined in the two determinations, that is, whether the contrast is equal to more than a predetermined value and whether the luminance falls within a predetermined range. However, with regard to the AF frames 802 and 808 to 811 on the electronic time board 211 as an object, since the object is moving because of a change in the signal representing the evaluation image with the lapse of time during moving object determination, it is determined that distance measurement cannot be performed by TVAF. As a consequence, CAL_NG_FLAG is recorded. As a result, as shown in FIG. 11, the AF frames 802 and 808 to 811 are unlighted, and only the AF frames where focus calibration can be performed are displayed.

Referring to FIG. 9, whether focus detection can be performed by the contrast detection method is determined by the three determination methods, that is, contrast determination, luminance determination, and moving object determination using an image capturing signal from the RGB photometric sensor 13. However, it is possible to use any determination method which can determine an object from which it is difficult to obtain high focus detection accuracy by the contrast detection method using the image sensor 6, by using an image capturing signal from the RGB photometric sensor 13. For example, it is possible to use any determination method such as color determination for determining more accurate contrast values.

In addition, this embodiment has exemplified the mode of executing only focus calibration possibility determination. However, as in the first embodiment, it is possible to use the mode of executing focus calibration after possibility determination.

As described above, according to this embodiment, whether focus calibration can be performed with respect to the object selected by the user is determined by using an image capturing signal from the RGB photometric sensor 13. This can prevent any wasteful correcting operation with respect to an object from which sufficient focus calibration accuracy cannot be obtained. Therefore, the user can easily and efficiently perform focus calibration.

Third Embodiment

Figure 12:
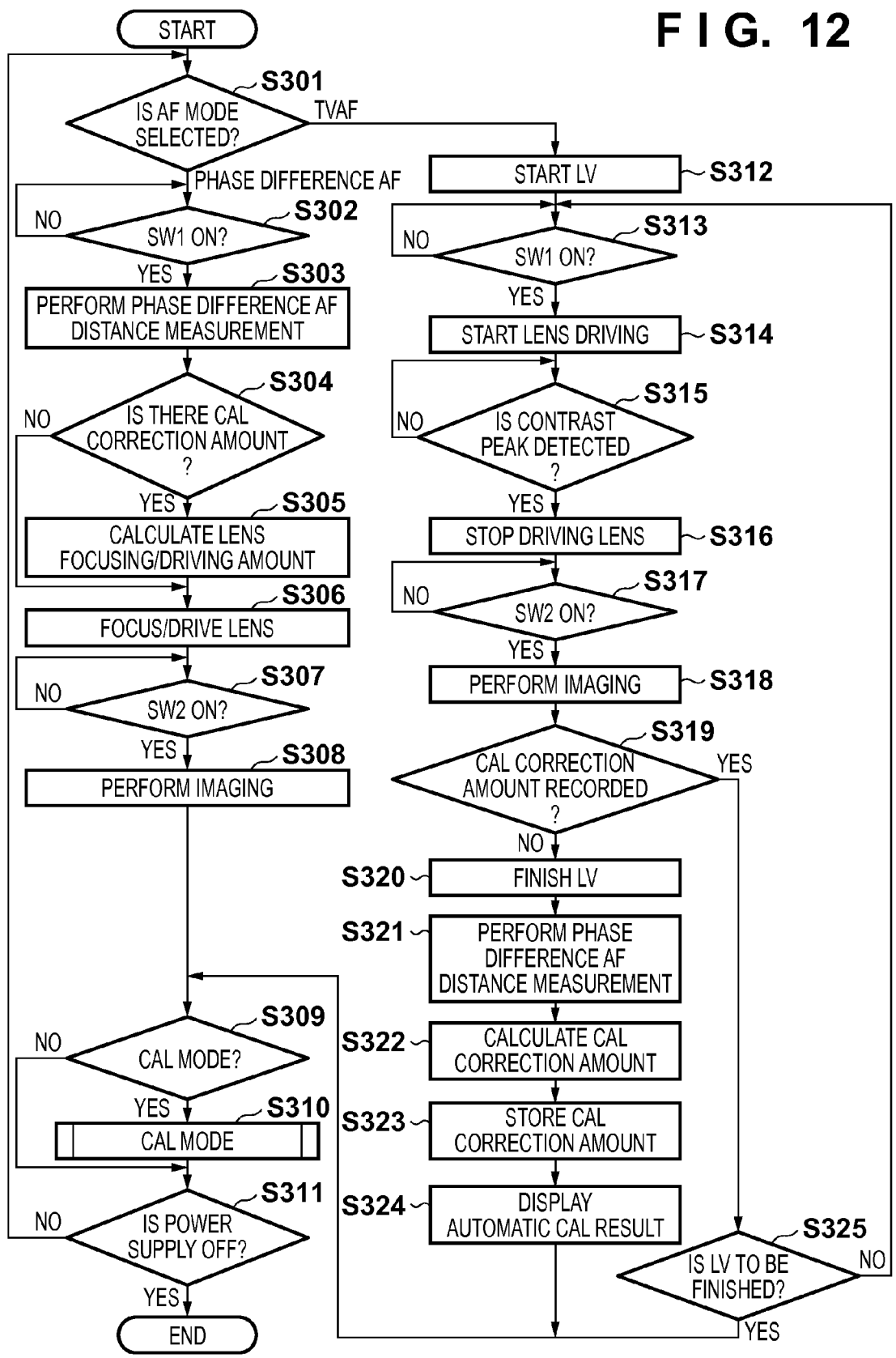
FIG. 12 is a flowchart showing a basic operation including an automatic focus calibration function in the third embodiment.

The operation of a digital single-lens reflex camera according to this embodiment will be described with reference to the flowcharts shown in FIGS. 12 and 13. The flowchart of FIG. 12 shows the basic operation of the digital single-lens reflex camera according to the third embodiment which has an automatic focus calibration function in a digital single-lens reflex camera system including the digital single-lens reflex camera and an interchangeable lens. The arrangements of the camera body and the interchangeable lens according to this embodiment are the same as those in the first embodiment, and the same reference numerals as those in the first embodiment denote constituent elements common to those of the first embodiment. An MPU 30 and a memory controller 31, both of which are computers, execute the operations shown in FIGS. 12 and 13 in accordance with computer programs.

In step S301, the user selects an AF mode upon turning on the power supply of the camera by operating a power button 48. If phase difference AF is selected, the process advances to step S302. If TVAF is selected, the process advances to step S312.

In step S302, the MPU 30 determines whether the user has half-pressed a release button 43 to turn on a first switch SW1. If YES in step S302, an object is confirmed, and the process advances to step S303. If NO in step S302, the process waits until the first switch SW1 is turned on.

In step S303, the MPU 30 performs focus detection by the phase difference detection method with respect to a distance measurement point corresponding to a setting in the camera at this time via a focus detection circuit 36, and calculates a phase difference in-focus position based on the detection result. The MPU 30 then temporarily records the position in an SDRAM 53.

In step S304, the MPU 30 determines whether there is a CAL correction amount for the distance measurement point where the phase difference in-focus position has been calculated. If YES in step S304, the process advances to step S305. If NO in step S304, the process advances to step S306.

In step S305, the MPU 30 reads out a CAL correction amount recorded in an EEPROM 32, and adds the amount to the phase difference in-focus position temporarily recorded in the SDRAM 53. In step S306, the MPU 30 transmits the phase difference in-focus position, to which the CAL correction amount is added, to a lens control circuit 33. The lens control circuit 33 then calculates the movement amount of a focus lens 3a, and drives the focus lens 3a to the phase difference in-focus position via a focus adjustment circuit 34.

In step S307, the MPU 30 determines whether the user has fully pressed the release button 43 to turn on a second switch SW2. If YES in step S307, the process advances step S308. If NO in step S307, the process waits until the second switch SW2 is turned on.

In step S308, the MPU 30 shoots the object. More specifically, first of all, the MPU 30 controls a mirror motor (not shown) via a motor driving circuit 38 to make a main mirror 4 and a sub-mirror 7 pivot to the up position and retract outside the imaging optical path. The MPU 30 then drives a charge motor (not shown) via a shutter driving circuit 39 to operate a shutter 5 at a set shutter speed. At the same time, the memory controller 31 causes an image sensor 6 to start photoelectric conversion, and causes an image processing circuit 54 to generate an image by using an image capturing signal read out from the image sensor 6. Upon finishing driving the shutter 5, the MPU 30 drives the charge motor (not shown) via the shutter driving circuit 39 to set the shutter 5 in a charged state so as to prepare for the next shooting operation. The MPU 30 controls a mirror motor (not shown) via the motor driving circuit 38 to make the main mirror 4 and the sub-mirror 7 pivot from the up position to the down position, and terminates the series of shooting operations.

In step S309, the MPU 30 determines whether the user has selected a focus calibration mode. If YES in step S309, the process advances to step S310. If NO in step S309, the process advances to step S311. In step S310, the MPU 30 executes the selected focus calibration mode. This operation will be described in detail later.

In step S311, the MPU 30 determines whether the user has turned off the power supply by operating the power button 48. If YES in step S311, the MPU 30 terminates the camera operation. If NO in step S311, the process returns to step S301 to continue the camera operation.

In step S312, the MPU 30 starts live view display upon selection of TVAF in step S301. More specifically, the MPU 30 controls the mirror motor (not shown) via the motor driving circuit 38 to make the main mirror 4 and the sub-mirror 7 pivot to the up position and retract outside the imaging optical path. The MPU 30 also drives the charge motor (not shown) via the shutter driving circuit 39 to set the shutter 5 in an open state as shown in FIG. 2. The memory controller 31 then causes the image sensor 6 to start photo-electric conversion, and causes a liquid crystal monitor 14 to display a live view image which is the moving image generated by the image processing circuit 54 using the image capturing signal read out from the image sensor 6. The user then sets the position of a TVAF frame 300 displayed on the liquid crystal monitor 14, and selects an object.

In step S313, the MPU 30 determines whether the user has half-pressed the release button 43 to turn on the first switch SW1. If YES in step S313, the position of the TVAF frame 300 is confirmed, and the process advances to step S303. If NO in step S313, the process waits until the first switch SW1 is turned on.

In step S314, the MPU 30 drives the focus motor 15 via the lens control circuit 33 to start driving the focus lens 3*a* in increments of a predetermined amount.

In step S315, the contrast in-focus position of the focus lens 3*a* is detected by the contrast detection method. More specifically, first of all, the memory controller 31 generates a contrast evaluation image by reading out an image capturing signal in the TVAF frame 300 from the image sensor 6, and temporarily records the image in the SDRAM 53. The memory controller 31 determines whether a peak image is obtained. If a peak image can be detected, the process advances to step S316. If no peak image can be detected, a peak image is repeatedly detected at each position set by driving the focus lens 3*a* by a predetermined amount. Since a peak image cannot be detected without acquiring at least three contrast evaluation images, step S315 is repeated at least three times.

In step S316, the MPU 30 stops the focus motor 15 via the lens control circuit 33 to finish driving the focus lens 3*a*.

In step S317, the MPU 30 determines whether the user has fully pressed the release button 43 to turn on the second switch SW2. If YES in step S317, the process advances to step S318. If NO in step S317, the process waits until the second switch SW2 is turned on.

In step S318, the memory controller 31 causes the image sensor 6 to start photoelectric conversion, and causes the image processing circuit 54 to generate an image by using the image capturing signal read out from the image sensor 6.

In step S319, it is determined whether a distance measurement point overlapping the position of the TVAF frame 300 having undergone contrast focusing and a CAL correction amount for a distance measurement point arranged near the distance measurement point are recorded in the EEPROM 32. If no CAL correction amount is recorded, the process advances to step S320 to execute an automatic focus calibration function for the distance measurement point. If a CAL correction amount is recorded, the process advances to step S325. In this case, a CAL correction amount is checked at a specific distance measurement point. However, this operation may be formed for all the distance measurement points.

In step S320, the MPU 30 finishes the live view display. More specifically, the MPU 30 controls the mirror motor (not shown) via the motor driving circuit 38 to make the main mirror 4 and the sub-mirror 7 pivot to the down position shown in FIG. 1.

In step S321, the MPU 30 performs focus detection by the phase difference detection method via the focus detection circuit 36 with respect to a distance measurement point subjected to automatic focus calibration, and calculates a phase difference in-focus position based on the detection result. The MPU 30 then temporarily records the position in the SDRAM 53.

In step S322, the MPU 30 calculates the difference between the contrast in-focus position obtained in step S315 and the phase difference in-focus position of the distance measurement point obtained in step S321. This difference is a CAL correction amount for the phase difference in-focus position of the focus calibration possible distance measurement point.

In step S323, the MPU 30 records the calculated CAL correction amount for the distance measurement point in the EEPROM 32. In step S324, an AF frame 800 corresponding to the distance measurement point for which the CAL correction amount is recorded is displayed, and an automatic focus calibration result is displayed on the liquid crystal monitor 14. In this case, it is possible to use any display method which allows the user to visually recognize the automatic focus calibration result.

In step S325, it is determined whether the user has finished the live view display. If the user has performed the operation to finish the display, the process advances to step S309. If the user has not performed the operation, the process moves to step S313 to continue the live view display.

Figure 13:
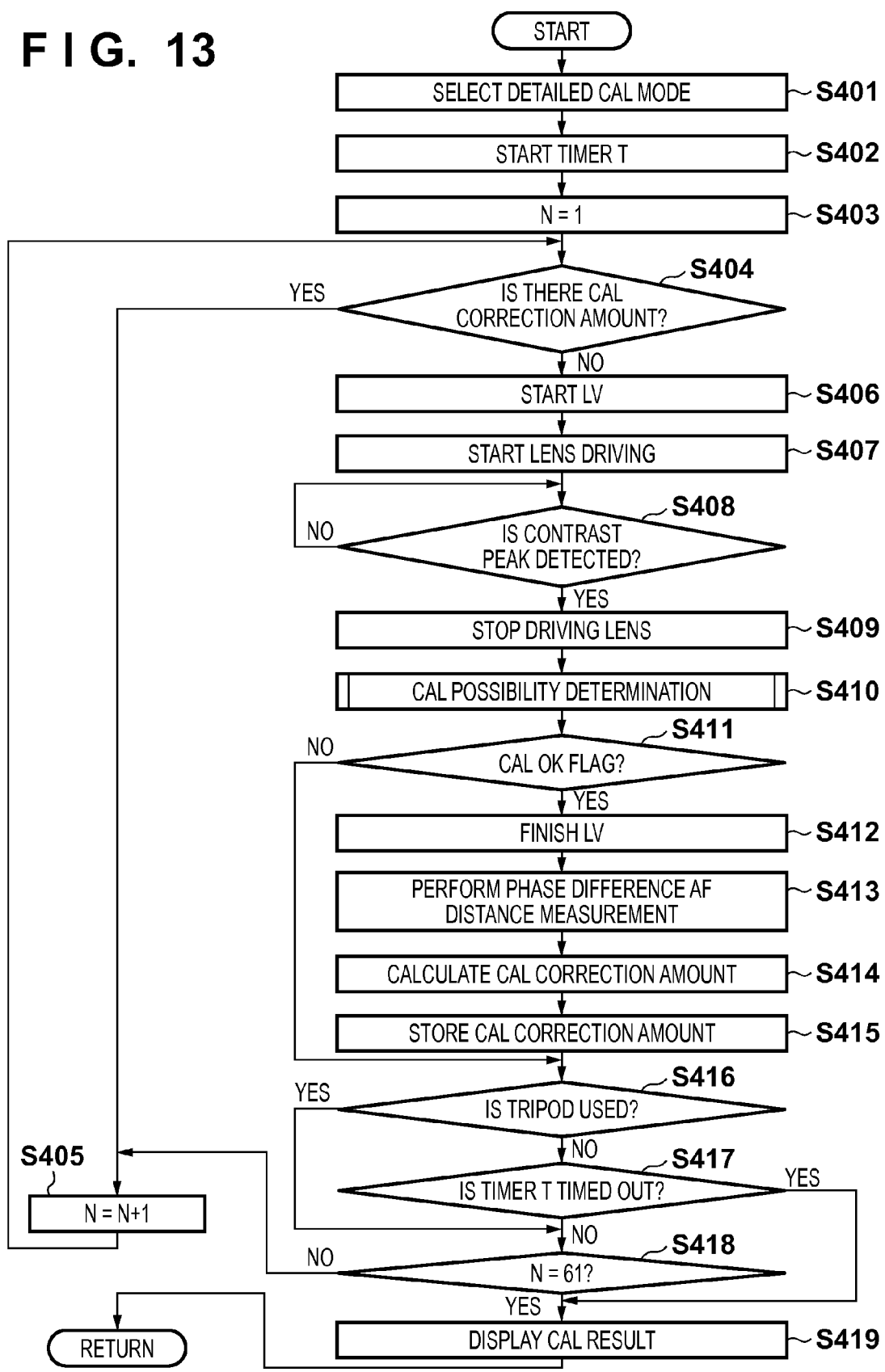
FIG. 13 is a flowchart showing a focus calibration operation in the third embodiment.

The flowchart of FIG. 13 shows an operation performed in a detailed calibration mode of performing focus calibration. The detailed calibration mode is a mode of performing focus calibration with respect to all distance measurement points by repeating TVAF and phase difference AF for each distance measurement point.

In step S401, the MPU 30 advances to step S402 when the user selects the detailed calibration mode by operating the mode button 44 and the electronic dial 45.

In step S402, the MPU 30 starts the counting operation of an operation timer T for focus calibration. In this case, the operation timer T may be automatically set in the camera or may be set in advance by the user. In step S403, 1 is set in a counter N for counting the 61 distance measurement points of an area sensor 8*d*.

In step S404, it is determined whether a CAL correction amount for the Nth distance measurement point is recorded in the EEPROM 32. If YES in step S404, the process advances to step S405. If NO in step S404, the process advances to step S406. In this case, it is determined that focus calibration is not to be performed again with respect to each distance measurement point for which a CAL correction amount is recorded upon execution of the automatic focus calibration function in steps S319 to S324. In step S405, the MPU 30 adds 1 to the counter N, and repeats the determination in step S404.

In step S406, the MPU 30 starts live view display to perform focus calibration. More specifically, the MPU 30 controls a mirror motor (not shown) via the motor driving circuit 38 to make the main mirror 4 and the sub-mirror 7 pivot to the up position and retract outside the imaging optical path. The MPU 30 also drives a charge motor (not shown) via the shutter driving circuit 39 to set the shutter 5 in an open state as shown in FIG. 2. The memory controller 31 causes the image sensor 6 to start photoelectric conversion, and causes the liquid crystal monitor 14 to display a live view image which is the moving image generated by the image processing circuit 54 using the image capturing signal read out from the image sensor 6. The user searches for an object subjected to focus calibration while seeing this live view image, and arranges the camera.

In step S407, the MPU 30 drives the focus motor 15 via the lens control circuit 33 to start driving the focus lens 3a in increments of a predetermined amount. In step S408, the contrast in-focus position of the focus lens 3a is detected by the contrast detection method. More specifically, first of all, the memory controller 31 generates a contrast evaluation image by reading out an image capturing signal in the TVAF frame 300 from the image sensor 6, and temporarily records the image in the SDRAM 53. The memory controller 31 determines whether a peak image has been obtained. If a peak image can be detected, the process advances to step S409. If no peak image can be obtained, a peak image is repeatedly detected at each position set by driving the focus lens 3a by a predetermined amount. Since a peak image cannot be detected unless at least three contrast evaluation images are acquired, step S408 is repeated at least three times.

In step S409, the MPU 30 stops the focus motor 15 via the lens control circuit 33 to finish driving the focus lens 3a. In step S410, the focus calibration possibility determination routine is executed. This focus calibration possibility determination routine is the same routine in FIG. 5, and a description of it will be omitted.

In step S411, the MPU 30 determines the focus calibration possibility determination routine result at the Nth distance measurement point. If the result indicates CAL_OK_FLAG, the process advances to step S412. If the result indicates CAL_NG_FLAG, the process advances to step S416.

In step S412, the MPU 30 finishes the live view display. More specifically, the MPU 30 controls the mirror motor (not shown) via the motor driving circuit 38 to make the main mirror 4 and the sub-mirror 7 pivot to the down position shown in FIG. 1.

In step S413, the MPU 30 performs focus detection by the phase difference detection method via the focus detection circuit 36 with respect to the Nth distance measurement point, and calculates a phase difference in-focus position based on the detection result. The MPU 30 then temporarily records the calculated position in the SDRAM 53.

In step S414, the MPU 30 calculates the difference between the contrast in-focus position obtained in step S408 and the phase difference in-focus position obtained in step S413. This difference is a CAL correction amount corresponding to the phase difference in-focus position of the Nth distance measurement point.

In step S415, the MPU 30 records the calculated CAL correction amount for the Nth distance measurement point in the EEPROM 32. In step S416, the MPU 30 determines via a sensor (not shown) whether a camera 1 is set on a tripod. If YES in step S416, the process advances to step S418. If NO in step S416, the process advances to step S417.

In step S417, it is determined whether the time set in an operation timer T has elapsed. If YES in step S417, the process advances to step S419. If NO in step S417, the process advances to step S418.

In step S418, it is determined whether focus calibration with respect to the 61st distance measurement point is complete, that is, focus calibration with respect to all the distance measurement points is complete. If YES in step S418, the process advances to step S419. If NO in step S418, the process advances to step S405.

In step S419, when focus calibration with respect to all the distance measurement points is complete or the operation timer T for focus calibration has timed out, the focus calibration result is displayed on the liquid crystal monitor 14. As this display method, any display method can be used as long as it allows the user to visually recognize the result. When the display is complete, the process returns to step S311.

As described above, according to this embodiment, it is possible to inhibit the execution of focus calibration with respect to a distance measurement point for which a CAL correction amount is set by automatic focus calibration. In addition, if focus calibration takes much time because of a large number of distance measurement points, it is possible to perform focus calibration only within a preset time. In addition, if a tripod is used, it is possible to perform focus calibration with respect to all the distance measurement points even within a preset time. This allows the user to easily and efficiently perform focus calibration.

This embodiment is configured to neglect the operation timer T when using a tripod. However, the operation time may be prolonged. Furthermore, the user may set the operation time. Although the operation of focus calibration is limited by the preset time of the operation timer T, the operation may be limited by the camera shake amount detected by an acceleration sensor (not shown) within the camera or the lens. For example, it may be determined, by threshold processing for shake amounts, that focus calibration is to be continued. Alternatively, if the shake amount is small, the operation timer T for time limit may be prolonged. Furthermore, if a large shake amount is measured, focus calibration may be stopped.

Fourth Embodiment

Figure 14:
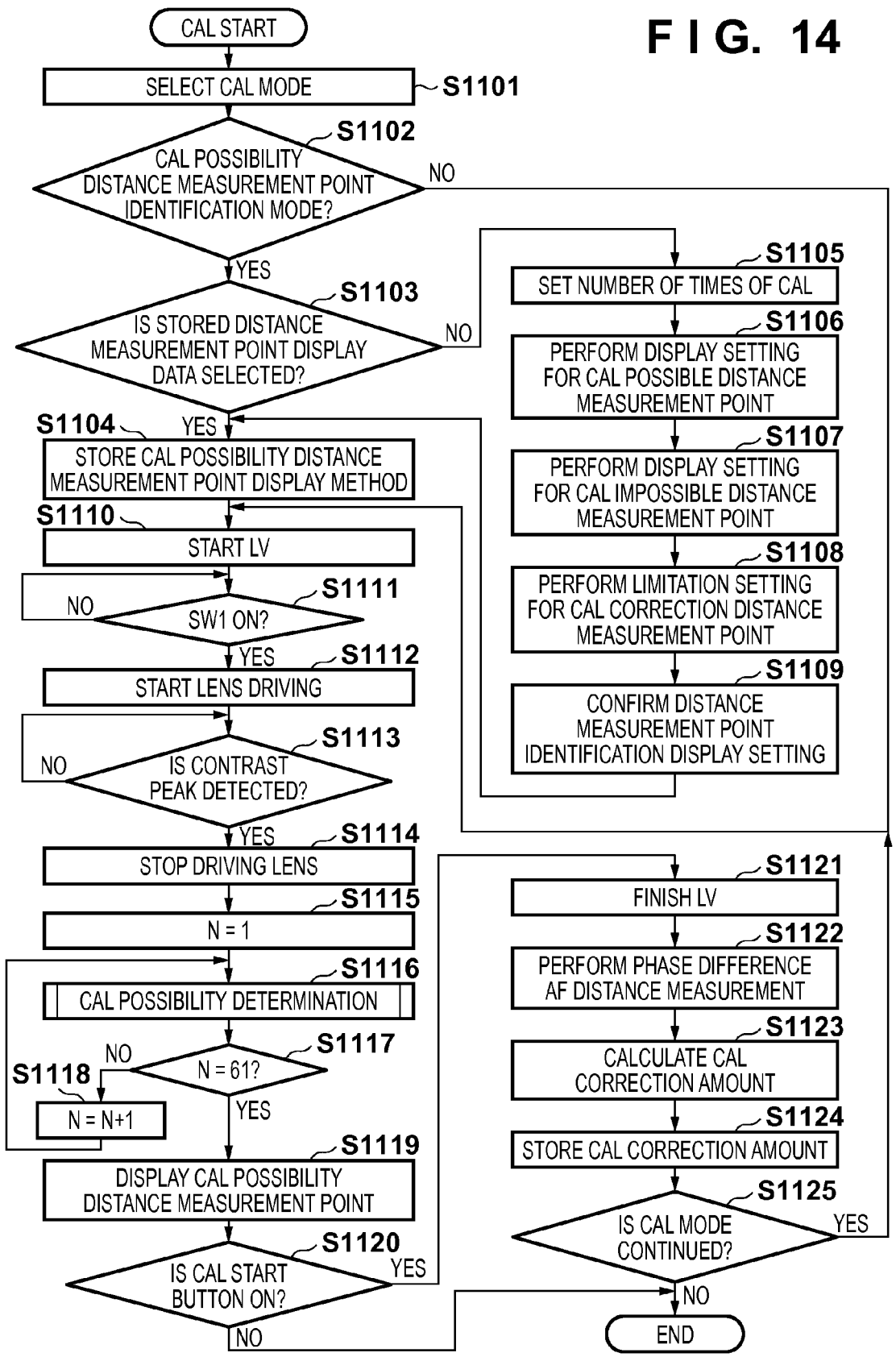
FIG. 14 is a flowchart showing a focus calibration operation in the fourth embodiment.

The operation of the digital single-lens reflex camera according to this embodiment will be described with reference to the flowcharts shown in FIGS. 14 and 5. The flowchart of FIG. 14 shows an operation performed in the normal calibration mode of performing focus calibration. The normal calibration mode is a mode of simultaneously performing focus calibration with respect to a plurality of distance measurement points at a given position of a focus lens 3a. The arrangements of the camera body and the interchangeable lens according to this embodiment are the same as those in the first embodiment, and the same reference numerals as those in the first embodiment denote constituent elements common to those of the first embodiment. An MPU 30 and a memory controller 31, both of which are computers, execute the operations shown in FIGS. 14 and 5 in accordance with computer programs.

In step S1101, the MPU 30 advances to step S1102 when the user selects the normal calibration mode by operating a mode button 44 and an electronic dial 45.

In step S1102, the MPU 30 causes a liquid crystal monitor 14 to display whether to shift to a mode in which it is possible to discriminate, by changing the AF frame display at a phase difference AF distance measurement point, whether a proper focus correction amount has been obtained by focus calibration. When performing an operation in the normal focus calibration mode, the process advances to step S1110.

In this case, the displayed state of focus calibration possibility determination results on the liquid crystal monitor 14 is the same as that shown in FIG. 7 in the first embodiment.

Figure 15:
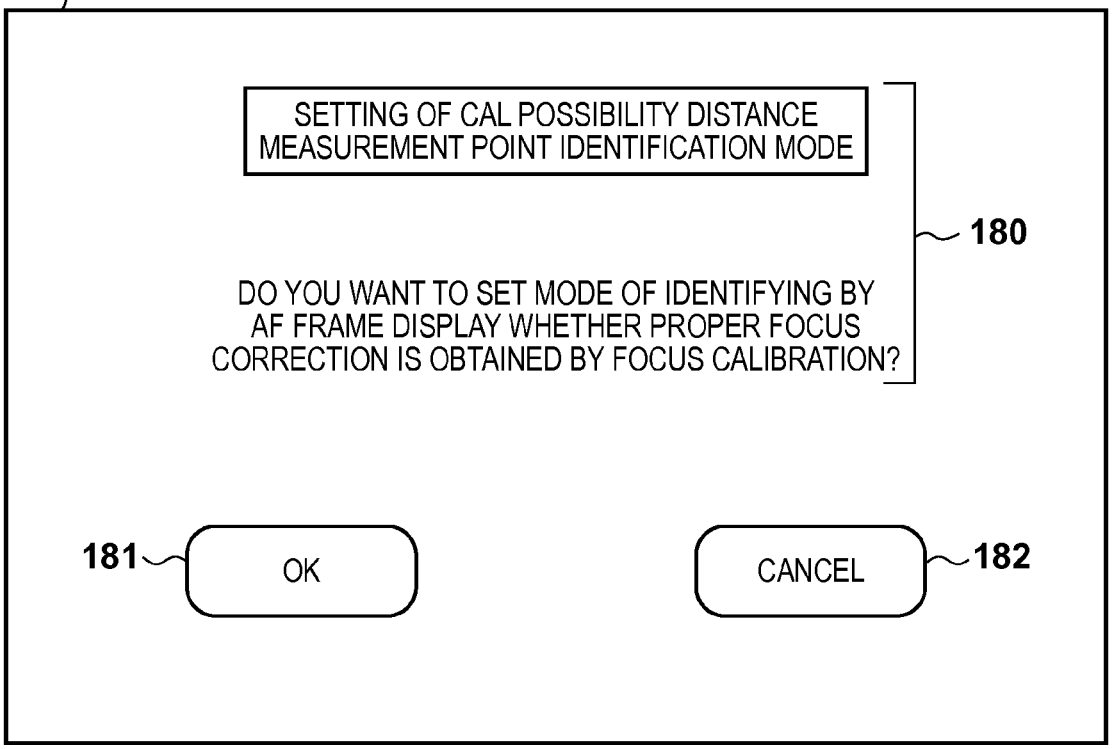
FIG. 15 is a view showing focus calibration possibility distance measurement point identification mode setting in the fourth embodiment.

FIG. 15 shows a display 180 on the liquid crystal monitor 14 when making a shift to a mode of individually setting AF frame (803, 831, 859, and the like) display after the execution of calibration based on focus calibration possibility determination results.

Upon determining in step S1103 that an identification display of a phase difference AF distance measurement point in the mode in step S1102 is to be selected from the data set and stored in the image capturing apparatus in advance, the MPU 30 advances to step S1104. Upon determining that a distance measurement point display identification method is to be newly customized and set, the process advances to step S1105.

Figure 16:
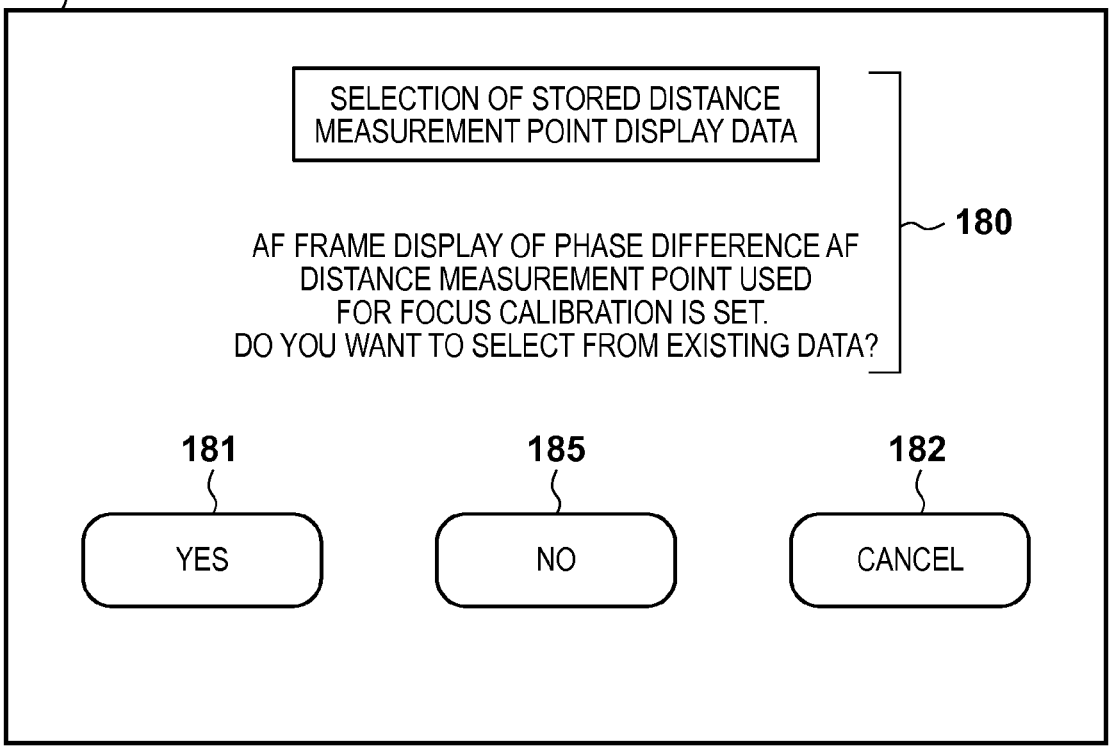
FIG. 16 is a view showing data selection in focus calibration possibility distance measurement point identification display setting in the fourth embodiment.

Referring to FIG. 16, when selecting an AF frame (800) display at the time of focus calibration possibility determination from the data stored in the MPU 30 of the digital single-lens reflex camera, the user selects "Yes" 181. When newly setting an AF frame (800) display after focus calibration possibility determination, the user selects "No" 185.

Figure 17:
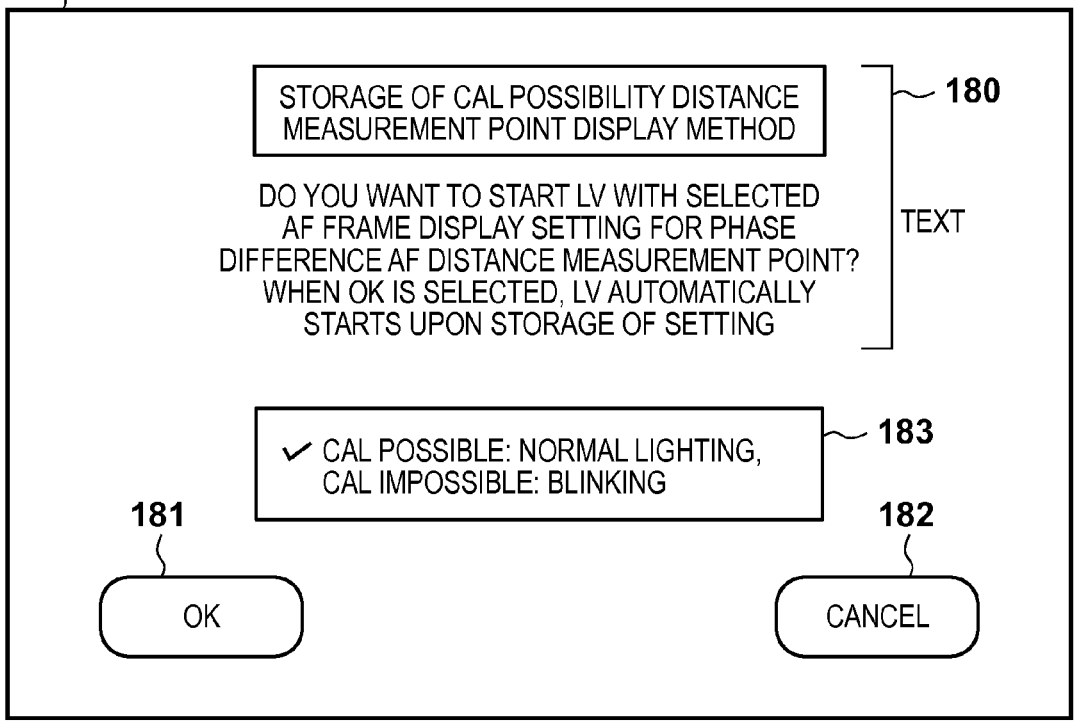
FIG. 17 is a view showing focus calibration possibility distance measurement point identification display setting in the fourth embodiment.

In step S1104, an AF frame display (803, 831, 859, and the like) set or selected by the user at the time of focus calibration is temporarily stored in the MPU 30 of the digital single-lens reflex camera. FIG. 17 shows a display on the liquid crystal monitor 14 before the start of LV after the setting of an AF frame (800) display at the time of focus calibration.

In step S1105, a setting is made to determine whether to specify the number of times of focus calibration.

Figure 18:
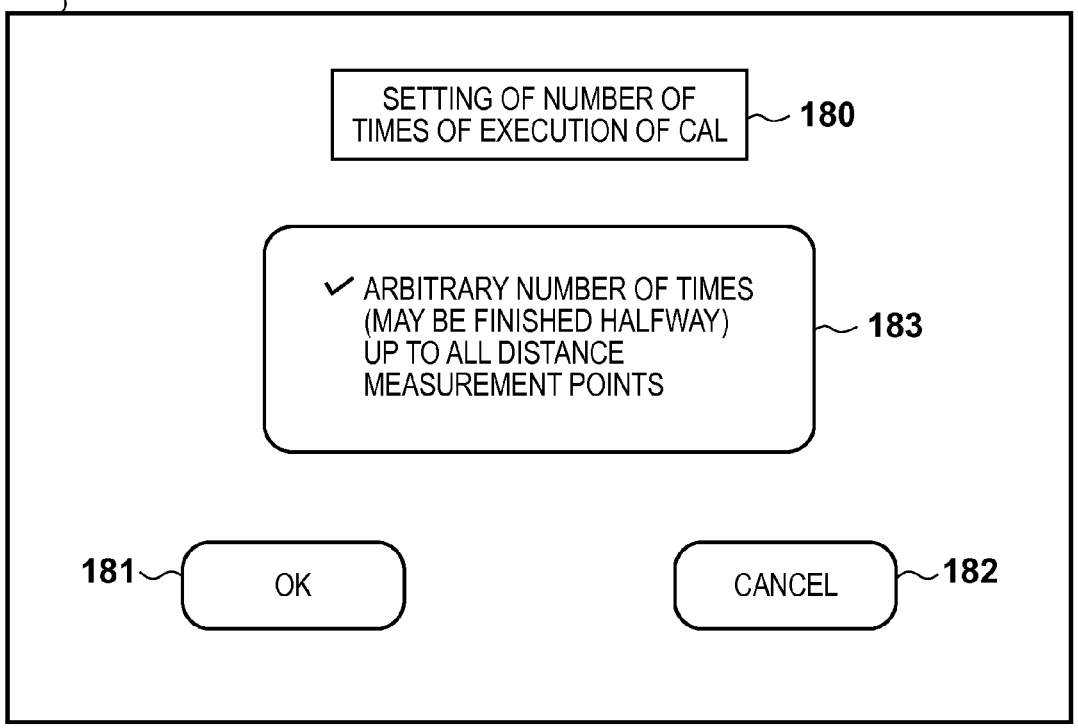
FIG. 18 is a view showing focus calibration execution count setting in individual setting for focus calibration possibility distance measurement point identification display in the fourth embodiment.

FIG. 18 shows a display on the liquid crystal monitor 14 when setting the number of times of execution of focus calibration. The user sets the number of times from a count selection display 183 by operating the electronic dial 45 or a multi-controller 46 or touch-operating the liquid crystal monitor 14.

In step S1106, when making a setting to perform focus calibration a plurality of times, a display method for phase difference distance measurement points processed until a focus correction value is stored is set.

FIG. 19 shows a screen for selecting a display setting for an AF frame (800), for which the focus calibration determination result indicates OK or from which a proper focus correction value is obtained, by operating the electronic dial 45 or the multi-controller 46 or touch-operating the liquid crystal monitor 14.

In step S1107, in the setting of performing focus calibration a plurality of times, a display method is set for each phase difference distance measurement point from which a proper focus correction value could not be obtained.

FIG. 20 shows a screen for selecting a display setting for an AF frame (800), for which the focus calibration determination result indicates NG, by operating the electronic dial 45 or the multi-controller 46 or touch-operating the liquid crystal monitor 14.

In step S1108, a setting is made to determine whether to limit distance measurement points subjected to focus calibration.

Figure 21:
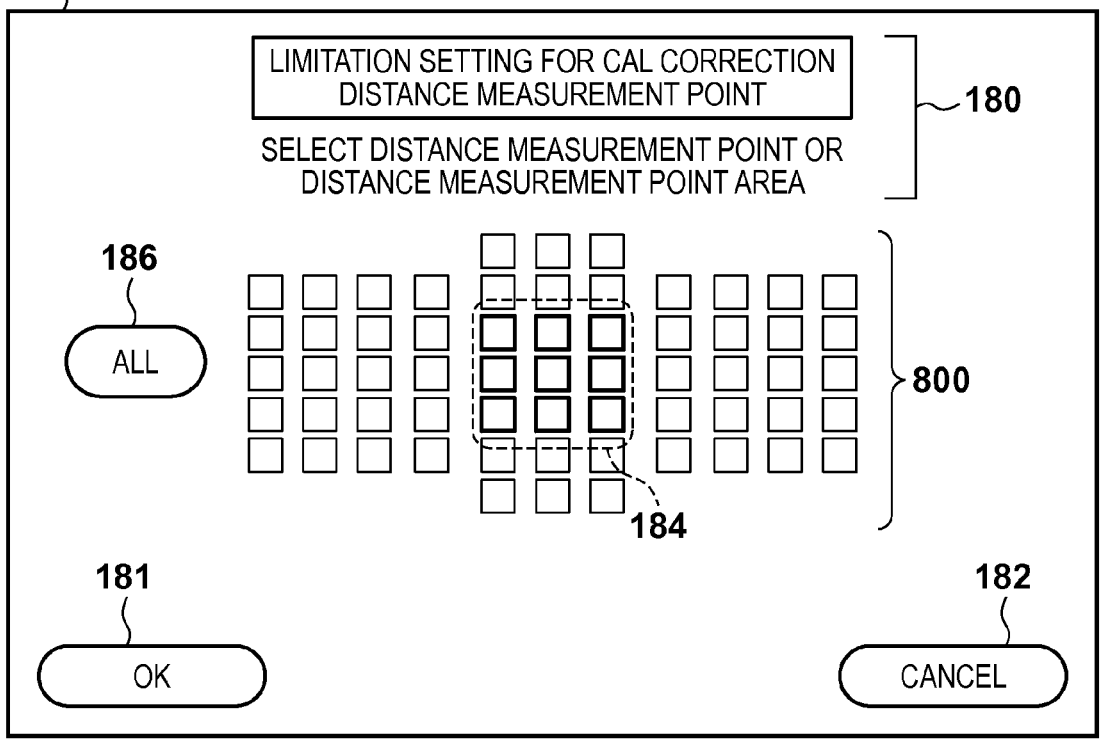
FIG. 21 is a view showing limiting setting for distance measurement points where focus correction values are acquired at the time of focus calibration in individual setting for focus calibration possibility distance measurement point identification display in the fourth embodiment.

FIG. 21 shows a screen for selecting a display setting for AF frame (800) when distance measurement points subjected to focus calibration are limited and determination results indicate OK, by operating the electronic dial 45 or the multi-controller 46 or touch-operating the liquid crystal monitor 14. For example, selected distance measurement points 184 are displayed differently from unselected distance measurement points. In addition, when distance measurement points subjected to focus calibration are not limited, "ALL" 186 is selected. Upon completing the selection of distance measurement points, "OK" 181 is selected.

In step S1109, a PN liquid crystal panel 12 displays information for the confirmation of AF frame display settings to confirm the settings made in steps S1105 to S1108.

Figure 22:
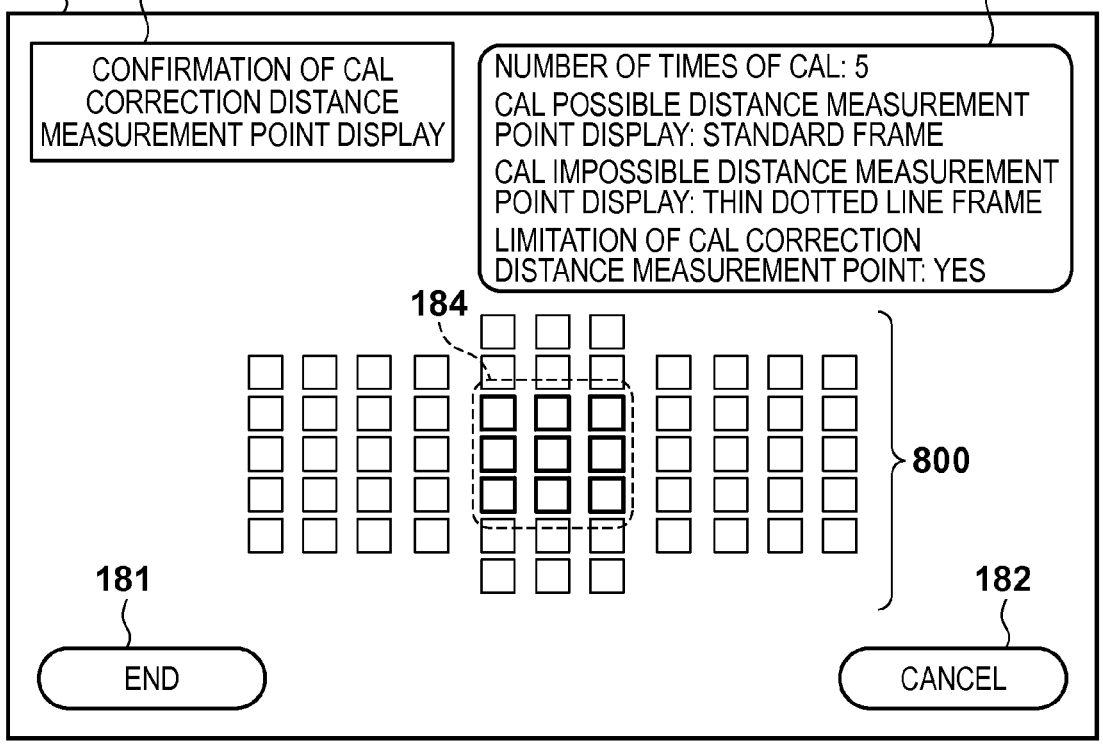
FIG. 22 is a view showing individual setting confirmation in focus calibration possibility distance measurement point identification display in the fourth embodiment.

FIG. 22 shows a screen displayed on the liquid crystal monitor 14 to confirm the display setting contents of AF frames (800) when an individual distance measurement point identification display is set at the time of focus calibration.

In step S1110, the MPU 30 starts LV (live view) display to perform focus calibration. More specifically, the MPU 30 controls a mirror motor (not shown) via a motor driving circuit 38 to make a main mirror 4 and a sub-mirror 7 pivot to the up position and retract outside the imaging optical path. In addition, the MPU 30 drives a charge motor (not shown) via a shutter driving circuit 39 to set a shutter 5 in an open state as shown in FIG. 2. The memory controller 31 then causes an image sensor 6 to start photoelectric conversion (electric charge accumulation and electric charge readout), and causes the liquid crystal monitor 14 to display a live view image which is the moving image generated by an image processing circuit 54 using the image capturing signal read out from the image sensor 6. The user searches for an object for focus calibration while seeing this live view image, and arranges the camera.

Although described in the first embodiment, FIG. 6 is a view showing the display state of the liquid crystal monitor 14 in the live view mode. The liquid crystal monitor 14 is displaying a traffic sign 200 which is an object as a live view image. A TVAF frame 300 is displayed in the center of the imaging screen. Although the TVAF frame 300 is arranged in the center of the imaging screen in FIG. 6, the TVAF frame 300 may be arranged at any position on the imaging screen.

In step S1111, the MPU 30 determines whether the user has half-pressed a release button 43 to turn on a first switch SW1. If YES in step S1111, an object subjected to focus calibration is confirmed. The process then advances to step S1112. If NO in step S1111, the process waits until the first switch SW1 is turned on.

In step S1112, the MPU 30 drives the focus motor 15 via the lens control circuit 33 to start driving the focus lens 3a in increments of a predetermined amount. In step S1113, the contrast in-focus position of the focus lens 3a is detected by the contrast detection method. More specifically, first of all, the memory controller 31 reads out an image capturing signal in the TVAF frame 300 from the image sensor 6, and generates a contrast evaluation image. The memory controller 31 then temporarily records the signal in an SDRAM 53. The memory controller 31 determines whether an image exhibiting maximum (peak) contrast (to be referred to as a peak image hereinafter) has been obtained. If a peak image can be detected, the process advances to step S1114. If a peak image cannot be detected, a peak image is repeatedly detected at a position to which the focus lens 3a is driven by a predetermined amount. Since a peak image cannot be detected unless at least three contrast evaluation images are acquired, step S1113 is repeated at least three times.

In step S1114, the MPU 30 stops the focus motor 15 via the lens control circuit 33 to finish driving the focus lens 3a. At this time point, the focus lens 3a is at rest at a position (contrast in-focus position) where the traffic sign 200 as an object subjected to focus calibration is in focus.

In step S1115, 1 is set in a counter N for counting 61 distance measurement points of an area sensor 8d. In step S1116, the focus calibration possibility determination routine is executed. A detailed operation in this routine will be described later.

In step S1117, it is determined whether the focus calibration possibility determination routine has been executed with respect to the 61st distance measurement point, that is, has been completed with respect to all the distance measurement points. If YES in step S1117, the process advances to step S1119. If NO in step S1117, the process advances to step S1118. In step S1118, 1 is added to the counter N, and step S1116 is repeated.

In step S1119, the memory controller 31 displays, on the liquid crystal monitor 14, focus calibration possibility determination results on AF distance measurement frames corresponding to the area sensor 8d in correspondence with the phase difference AF frames set in steps S1106 and S1107. The focus calibration possibility determination results can be discriminated by CAL_OK_FLAG or CAL_NG_FLAG temporarily recorded in the SDRAM 53 in the focus calibration possibility determination routine described later.

Although described in the first embodiment, FIG. 7 shows a state in which focus calibration possibility determination results are displayed on the liquid crystal monitor 14. AF frames 800 indicating 61 distance measurement points of the area sensor 8d are displayed. The individual numbers of the AF frames 800 are counted from the left end to the right end, and from the upper side to the lower side, starting from an AF frame 801 on the upper left, with the central frame being an AF frame 831 and the lower right frame being an AF frame 861. Therefore, the first distance measurement point of the counter N corresponds to an AF frame 801, and the 61st distance measurement point corresponds to an AF frame 861. In addition, a CAL start button 310 and a cancel button 320 are displayed.

AF frames indicating distance measurement points where focus calibration can be performed are displayed in solid lines (801, 804, 814, 848, 858, 861, and the like). AF frames indicating distance measurement points where focus calibration cannot be performed are displayed in dotted lines (803, 831, 859, and the like). In the case shown in FIG. 7, the focus calibration possibilities of the respective distance measurement points are indicated by the solid and dotted lines of AF frames.

In step S1120, the MPU 30 determines whether the user has turned on a CAL start button 310. More specifically, if the user operates a SET button 47 upon selecting the CAL start button 310 by operating the electronic dial 45 or the multi-controller 46, the CAL start button is turned on, and the process advances to step S1121. If the CAL start button 310 is not turned on (that is, a cancel button 320 is turned on), the focus calibration mode is finished.

In step S1121, the live view display is finished. More specifically, the MPU 30 controls the mirror motor (not shown) via the motor driving circuit 38 to make the main mirror 4 and the sub-mirror 7 pivot to the down position shown in FIG. 1.

In step S1122, the MPU 30 performs focus detection by the phase difference detection method via the focus detection circuit 36 with respect to a distance measurement point determined as a focus calibration possible distance measurement point, calculates a phase difference in-focus position based on the result, and temporarily records the position in the SDRAM 53.

In step S1123, the MPU 30 calculates the difference between the contrast in-focus position obtained in step S1105 and the phase difference in-focus position of the focus calibration possible distance measurement point obtained in step S1122. This difference is a correction amount (to be referred to as a CAL correction amount hereinafter) for the phase difference in-focus position of the focus calibration possible distance measurement point. In step S1124, the MPU 30 stores the calculated CAL correction amount for the focus calibration possible distance measurement point in the EEPROM 32.

In step S1125, if the number of times of execution of focus calibration is less than the number of times set in step S1105, the process returns to step S1110 to continuously start LV. If the number of times of execution of focus calibration exceeds the number of times set in step S1105 or the operation is to be forcibly terminated, the calibration operation is terminated.

The flowchart of FIG. 5 shows an operation performed in the focus calibration possibility determination routine at all the distance measurement points. This operation has already been described in the first embodiment, and hence a description of it will be omitted.

Figure 23:
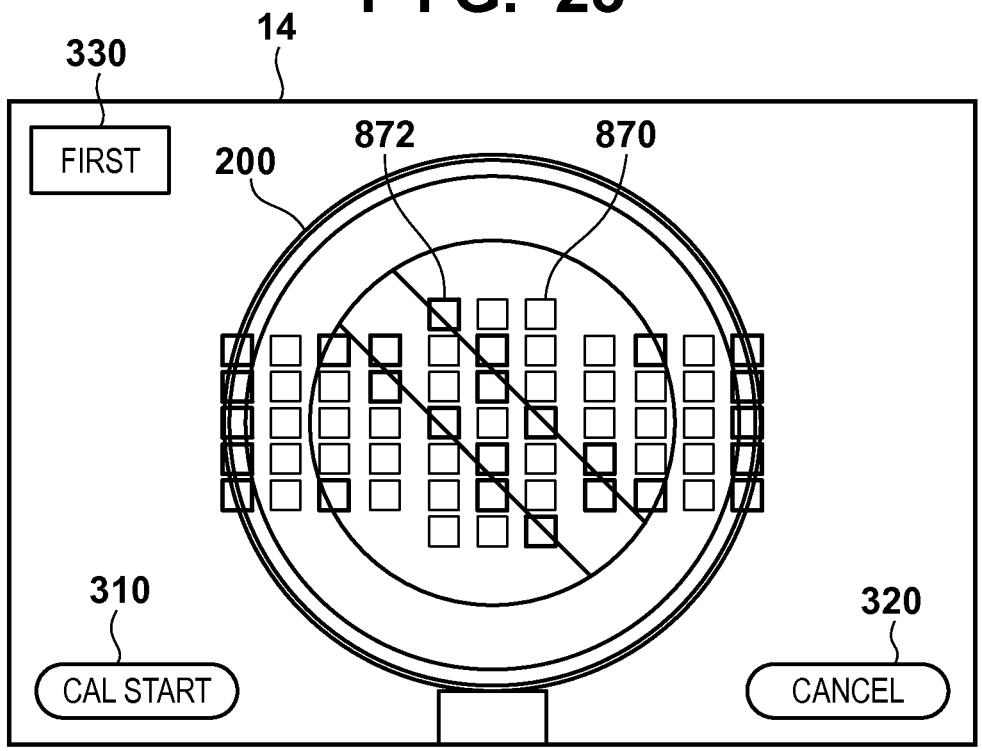
FIG. 23 is a view showing an object in the first focus calibration and in-focus display at an AF frame position in the fourth embodiment.

FIG. 23 is a view showing, as a thick solid line AF frame 872, each distance measurement point for which it is determined that focus calibration can be performed, and also showing, as a solid line AF frame 870, each distance measurement point for which it is determined that focus calibration cannot be performed, when the first focus calibration possibility determination is executed based on the same situation as that described with reference to FIG. 7 and a contrast determination criterion in the digital single-lens reflex camera in which all 61 distance measurement points are arranged. If OK is determined in this state, when the user selects the CAL start button 310, the first focus calibration starts. If NG is determined, the user selects the cancel button 320. The user checks the number of times of focus calibration on a display 330.

Figure 24:
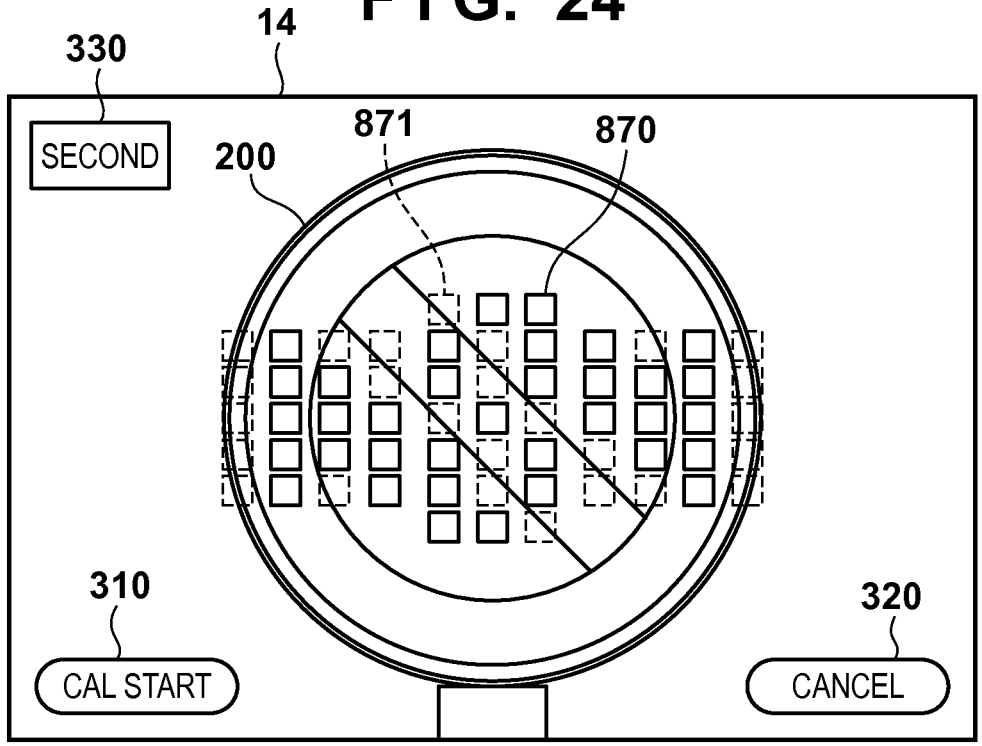
FIG. 24 is a view showing AF frame identification display as the first focus calibration result in the fourth embodiment.

FIG. 24 is a view showing, as a dotted line AF frame 871, each distance measurement point for which the processing has been completed up to the storage of a focus correction value, and also showing, as a solid line AF frame 870, each distance measurement point for which no focus correction value has been acquired, when the first focus calibration is complete. Subsequently, in order to perform the second focus calibration, the digital single-lens reflex camera is moved so as to make the solid line AF frame 870 intersect with an edge line of the traffic sign 200. The user then selects the CAL start button 310 to start the second focus calibration at the positions of the traffic sign 200 and the AF frame shown in FIG. 25.

Figure 25:
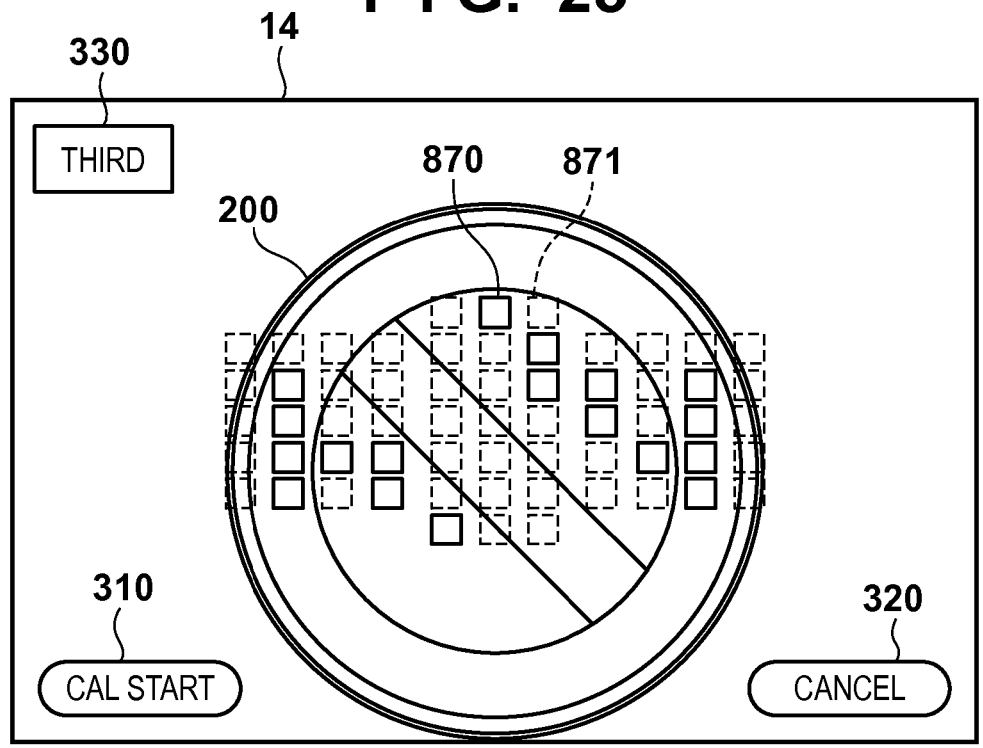
FIG. 25 is a view showing an object at the second focus calibration, an AF frame position, and AF frame display after the second focus calibration result in the fourth embodiment.

FIG. 25 is a view showing, as a dotted line AF frame 871, each distance measurement point for which the processing has been completed up to the storage of a focus correction value, and also showing, as a solid line AF frame 870, each distance measurement point for which no focus correction value has been acquired, when the second focus calibration is executed. In order to perform the third focus calibration with respect to the solid line AF frames 870, the positions of the traffic sign 200 and each AF frame are changed in the same manner as described above to set a positional relationship like that shown in FIG. 26.

Figure 26:
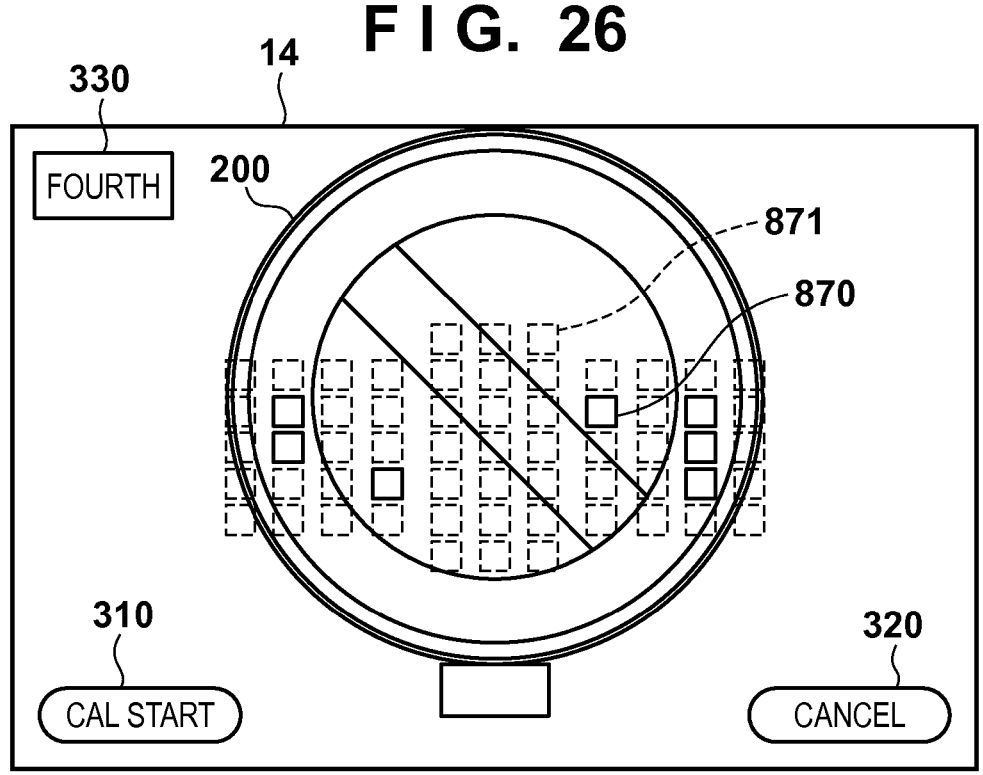
FIG. 26 is a view showing an object at the third focus calibration, an AF frame position, and AF frame display after the third focus calibration result in the fourth embodiment.

FIG. 26 is a view showing, as a dotted line AF frame 871, each distance measurement point for which the processing has been completed up to the storage of a focus correction value, and also showing, as a solid line AF frame 870, each distance measurement point for which no focus correction value has been acquired, when the third focus calibration is executed. In order to perform the fourth focus calibration with respect to the solid line AF frames 870, the positions of the traffic sign 200 and each AF frame are changed in the same manner as described above to set a positional relationship like that shown in FIG. 27.

Figure 27:
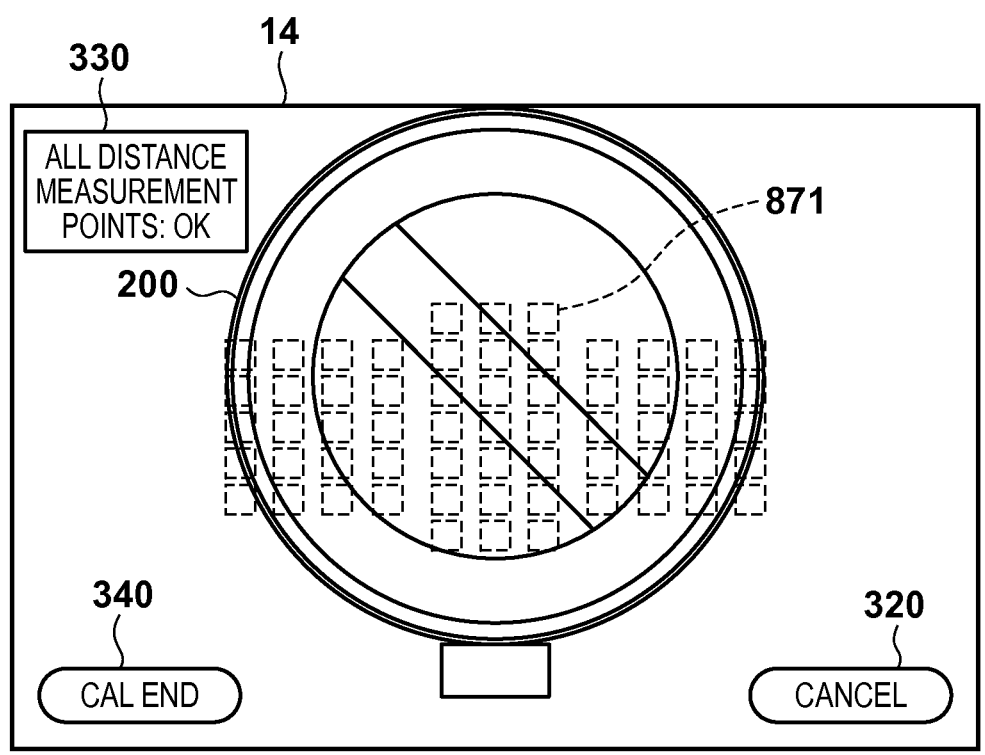
FIG. 27 is a view showing an object at the fourth focus calibration, an AF frame position, and display on a liquid crystal monitor after focus correction values obtained by focus calibration with respect to all distance measurement points are stored in the fourth embodiment.

Referring to FIG. 27, all the distance measurement points have undergone the processing up to the storage of focus correction values and become dotted line AF frames 871. Therefore, the user selects a CAL end button 340 to terminate the focus calibration.

As has been described above, according to this embodiment, it is determined by using an image capturing signal from the image sensor 6 whether it is possible to perform focus calibration with respect to the object selected by the user. This makes it possible to easily identify, based on focus calibration accuracy differences, distance measurement points, of a plurality of phase difference AF distance measurement points, for which proper focus correction values have been acquired or have not been acquired. This can prevent any wasteful correcting operation. Therefore, the user can easily and efficiently perform focus calibration without using any dedicated chart.

The preferred embodiments of the present invention have been described above. However, the present invention is not limited to these embodiments, and can be variously changed and modified within the spirit and scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-235386, filed Nov. 13, 2013, which is hereby incorporated by reference herein in its entirety.

What is claimed is:

1. An image capturing apparatus comprising:
an imaging unit configured to generate an imaging signal by photoelectrically converting an object image formed by an imaging optical system including a focus lens;
a sensor unit including a plurality of pairs of sensors each of which generate a pair of image signals by photoelectrically converting an object image formed by the imaging optical system in correspondence with each of a plurality of focus detection areas;
a first focus detection unit configured to detect a first in-focus position based on the pair of image signals generated by said sensor unit;
a second focus detection unit configured to detect a second in-focus position based on a signal output from said imaging unit;
a control unit configured to control a position of the focus lens and control display indicating the focus detection areas;
an acquisition unit configured to acquire a correction amount based on a difference between the first in-focus position and the second in-focus position and store the correction amount in a memory in a correction mode; and
a correction unit configured to correct the first in-focus position at the time of imaging based on the correction amount stored in the memory,
wherein in the correction mode,
said acquisition unit determines a first focus detection area, among the plurality of focus detection areas, from which the correction amount is configured to be acquired after the focus lens is moved to the second in-focus position by said control unit, and
said control unit controls display indicating the first focus detection area determined by said acquisition unit to be identifiable.

2. The apparatus according to claim 1, wherein said acquisition unit acquires the correction amount with respect to the first focus detection area after the control unit controls display indicating the first focus detection area to be identifiable.

3. The apparatus according to claim 1, wherein in the correction mode, said first focus detection unit calculates the first in-focus position based on the pair of image signals generated from the pair of sensors corresponding to the first focus detection area, and said acquisition unit acquires the correction amount based on a difference between the calculated first in-focus position and the second in-focus position.

4. The apparatus according to claim 1, wherein when there are the plurality of first focus detection areas, said acquisition unit acquires and stores the correction amount for each of the first focus detection areas.

5. The apparatus according to claim 1, wherein said control unit controls display indicating the first focus detection area to be a different form from display indicating the other focus detection area.

6. The apparatus according to claim 1, wherein said acquisition unit determines the first focus detection area from which the correction amount is configured to be acquired, based on at least one of a contrast, luminance, conflict of perspective, repetitive pattern, and color of an object image, by using the imaging signal or a photometric signal used for exposure control.

7. The apparatus according to claim 1, wherein said second focus detection unit detects the second in-focus position by a contrast detection method based on the imaging signal.

8. The apparatus according to claim 7, wherein said second focus detection unit detects the second in-focus position based on the imaging signal corresponding to a predetermined area in a screen.

9. The apparatus according to claim 1, wherein said control unit receives an operation to instruct whether to acquire the correction amount while the control unit controls display indicating the first focus detection area to be identifiable.

10. The apparatus according to claim 9, wherein when the operation to instruct to acquire the correction amount is performed, said acquisition unit acquires the correction amount with respect to the first focus detection area.

11. The apparatus according to claim 9, wherein when the operation to stop acquiring the correction amount is performed, said acquisition unit stops acquiring the correction amount.

12. A method of controlling an image capturing apparatus including an imaging unit configured to generate an imaging signal by photoelectrically converting an object image formed by an imaging optical system including a focus lens, and a sensor unit including a plurality of pairs of sensors each of which generate a pair of image signals by photoelectrically converting an object image formed by the imaging optical system in correspondence with each of a plurality of focus detection areas, the method comprising:
 a first focus detection step of detecting a first in-focus position based on the pair of image signals generated by the sensor unit;
 a second focus detection step of detecting a second in-focus position based on a signal output from the imaging unit;
 a focus control step of controlling a position of the focus lens;
 a display control step of controlling display indicating the focus detection areas;
 an acquisition step of acquiring a correction amount based on a difference between the first in-focus position and the second in-focus position in a correction mode;
 a storing step of storing the correction amount in a memory in the correction mode; and
 a correction step of correcting the first in-focus position at the time of imaging based on the correction amount stored in the memory,
 wherein in the correction mode, after the focus lens is moved to the second in-focus position in the focus control step, a first focus detection area, among the plurality of focus detection areas, from which the correction amount is configured to be acquired is determined in the acquisition step, and
 in the display control step, display indicating the first focus detection area determined in the acquisition step is controlled to be identifiable.

13. A non-transitory computer-readable recording medium storing a program for causing a computer to execute each step in a method of controlling an image capturing apparatus including an imaging unit configured to generate an imaging signal by photoelectrically converting an object image formed by an imaging optical system including a focus lens, and a sensor unit including a plurality of pairs of sensors each of which generate a pair of image signals by photoelectrically converting an object image formed by the imaging optical system in correspondence with each of a plurality of focus detection areas, the method comprising:
 a first focus detection step of detecting a first in-focus position based on the pair of image signals generated by the sensor unit;
 a second focus detection step of detecting a second in-focus position based on a signal output from the imaging unit;
 a focus control step of controlling a position of the focus lens;
 a display control step of controlling display indicating the focus detection areas;
 an acquisition step of acquiring a correction amount based on a difference between the first in-focus position and the second in-focus position in a correction mode;
 a storing step of storing the correction amount in a memory in the correction mode; and
 a correction step of correcting the first in-focus position at the time of imaging based on the correction amount stored in the memory,
 wherein in the correction mode, after the focus lens is moved to the second in-focus position in the focus control step, a first focus detection area, among the plurality of focus detection areas, from which the correction amount is configured to be acquired is determined in the acquisition step, and
 in the display control step, display indicating the first focus detection area determined in the acquisition step is controlled to be identifiable.

14. An image capturing apparatus comprising:
 an image sensor configured to generate an imaging signal by photoelectrically converting an object image formed by an imaging optical system including a focus lens;
 a sensor component including a plurality of pairs of sensors each of which generate a pair of image signals by photoelectrically converting an object image formed by the imaging optical system in correspondence with each of a plurality of focus detection areas; and
 one or more processors configured to function as:
 a first focus detection unit configured to detect a first in-focus position based on the pair of image signals generated by said sensor component;
 a second focus detection unit configured to detect a second in-focus position based on a signal output from said image sensor;
 a control unit configured to control a position of the focus lens and control display indicating the focus detection areas;
 an acquisition unit configured to acquire a correction amount based on a difference between the first in-focus position and the second in-focus position and store the correction amount in a memory in a correction mode; and
 a correction unit configured to correct the first in-focus position at the time of imaging based on the correction amount stored in the memory,
 wherein in the correction mode,
 said acquisition unit determines a first focus detection area, among the plurality of focus detection areas, from which the correction amount is configured to be acquired after the focus lens is moved to the second in-focus position by said control unit, and said control unit controls display indicating the first focus detection area determined by said acquisition unit to be identifiable.

15. The apparatus according to claim 14, wherein said acquisition unit acquires the correction amount with respect to the first focus detection area after the control unit controls display indicating the first focus detection area to be identifiable.

16. The apparatus according to claim 14, wherein in the correction mode, said first focus detection unit calculates the first in-focus position based on the pair of image signals generated from the pair of sensors corresponding to the first focus detection area, and said acquisition unit acquires the correction amount based on a difference between the calculated first in-focus position and the second in-focus position.

17. The apparatus according to claim 14, wherein when there are the plurality of first focus detection areas, said acquisition unit acquires and stores the correction amount for each of the first focus detection areas.

18. The apparatus according to claim 14, wherein said control unit controls display indicating the first focus detection area to be a different form from display indicating the other focus detection area.

19. The apparatus according to claim 14, wherein said acquisition unit determines the first focus detection area from which the correction amount is configured to be acquired, based on at least one of a contrast, luminance, conflict of perspective, repetitive pattern, and color of an object image, by using the imaging signal or a photometric signal used for exposure control.

20. The apparatus according to claim 14, wherein said second focus detection unit detects the second in-focus position by a contrast detection method based on the imaging signal.

21. The apparatus according to claim 20, wherein said second focus detection unit detects the second in-focus position based on the imaging signal corresponding to a predetermined area in a screen.

22. The apparatus according to claim 14, wherein said control unit receives an operation to instruct whether to acquire the correction amount while the control unit controls display indicating the first focus detection area to be identifiable.

23. The apparatus according to claim 22, wherein when the operation to instruct to acquire the correction amount is performed, said acquisition unit acquires the correction amount with respect to the first focus detection area.

24. The apparatus according to claim 22, wherein when the operation to stop acquiring the correction amount is performed, said acquisition unit stops acquiring the correction amount.

* * * * *